United States Patent
Wang et al.

(10) Patent No.: US 10,229,259 B2
(45) Date of Patent: Mar. 12, 2019

(54) TASK HANDOFF METHOD AND RELATED DEVICE

(71) Applicant: HUAWEI TECHNOLOGIES CO., LTD., Shenzhen (CN)

(72) Inventors: Chan Wang, Shenzhen (CN); Huangwei Wu, Shenzhen (CN); Xi Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 181 days.

(21) Appl. No.: 15/235,865

(22) Filed: Aug. 12, 2016

(65) Prior Publication Data
US 2017/0053110 A1 Feb. 23, 2017

(30) Foreign Application Priority Data
Aug. 21, 2015 (CN) .......................... 2015 1 0519935

(51) Int. Cl.
*G06F 21/32* (2013.01)
*G06F 21/62* (2013.01)
(Continued)

(52) U.S. Cl.
CPC ............ *G06F 21/32* (2013.01); *G06F 9/4856* (2013.01); *H04L 63/0861* (2013.01); *H04L 63/10* (2013.01); *H04L 67/10* (2013.01)

(58) Field of Classification Search
CPC ........ G06F 21/32; G06F 21/62; H04W 12/06; H04L 63/0861; H04L 63/10
See application file for complete search history.

(56) References Cited

U.S. PATENT DOCUMENTS

2005/0278532 A1* 12/2005 Fu ..................... H04L 63/0869
713/169
2009/0138606 A1* 5/2009 Moran ................... H04L 67/14
709/227
(Continued)

FOREIGN PATENT DOCUMENTS

CN 101674299 A 3/2010
CN 102609677 A 7/2012
(Continued)

OTHER PUBLICATIONS

"iPhone, iPad, and Mac. Connected Like Never Before", iOS8 Preview, retrieved from http://www.apple.com/ios/ios8/continuity/ on Jul. 21, 2014.*
(Continued)

*Primary Examiner* — Yonas A Bayou
(74) *Attorney, Agent, or Firm* — Staas & Halsey LLP

(57) ABSTRACT

A method includes: displaying, by a second device, prompt information, where the prompt information is used to inform a user that a task executed on a first device may be handed off to the second device for execution; receiving, by the second device, a first operation of the user, and collecting a fingerprint used when the user performs the first operation, where the first operation is used to request execution of the task on the second device; acquiring, by the second device, first fingerprint information and second fingerprint information by using the first device; calculating, by the second device according to the fingerprint used when the user performs the first operation and the first fingerprint information, third fingerprint information; and executing, by the second device, the task when the third fingerprint information matches the second fingerprint information.

9 Claims, 17 Drawing Sheets

(51) Int. Cl.
*H04W 12/06* (2009.01)
*H04L 29/06* (2006.01)
*G06F 9/48* (2006.01)
*H04L 29/08* (2006.01)

(56) References Cited

U.S. PATENT DOCUMENTS

| | | | | |
|---|---|---|---|---|
| 2009/0150178 A1* | 6/2009 | Sutton | A61B 5/222 | 705/2 |
| 2010/0262619 A1* | 10/2010 | Zargahi | G06F 8/61 | 707/770 |
| 2011/0055627 A1* | 3/2011 | Zawacki | H04L 67/14 | 714/15 |
| 2011/0289157 A1* | 11/2011 | Pirnazar | G06F 17/30873 | 709/206 |
| 2012/0206423 A1* | 8/2012 | Wong | H04N 5/44543 | 345/204 |
| 2012/0250657 A1* | 10/2012 | Zhou | H04W 12/06 | 370/331 |
| 2012/0284757 A1* | 11/2012 | Rajapakse | H04N 21/41407 | 725/81 |
| 2013/0174204 A1* | 7/2013 | Coburn, IV | H04N 21/43615 | 725/81 |
| 2014/0105561 A1* | 4/2014 | Chen | H04N 21/647 | 386/200 |
| 2016/0057233 A1* | 2/2016 | Scoda | H04L 67/146 | 709/227 |
| 2016/0308980 A1* | 10/2016 | Singh | H04L 67/148 | |

FOREIGN PATENT DOCUMENTS

| | | |
|---|---|---|
| CN | 101674299 B | 4/2013 |
| CN | 103516775 A | 1/2014 |
| CN | 103634109 A | 3/2014 |
| WO | 2015084750 A2 | 6/2015 |

OTHER PUBLICATIONS

AppleInsider Staff, "Os X Yosemite First Look Video: Handoff", retrieved from http://appleinsider.com/articles/14/06/05os-x-yosemite-first-look-vi-deo-handoff (Jun. 5, 2014).*

"iPhone, iPad, and Mac. Connected Like Never Before", iOS8 Preview, retrieved from http://www.apple.com/ios/ios8/continuity/ on Jul. 21, 2014. (Year: 2014).*

AppleInsider Staff, "OS X Yosemite First Look Video: Handoff", retrieved from http://appleinsider.com/articles/14/06/05os-x-yosemite-first-look-vi- deo-handoff (Jun. 5, 2014). (Year: 2014).*

Office Action, dated Dec. 5, 2018, in Chinese Application No. 201510519935.5 (12 pp.).

* cited by examiner

TASK HANDOFF METHOD AND RELATED DEVICE

CROSS-REFERENCE TO RELATED APPLICATIONS

This application claims the benefit of priority to Chinese Patent Application No. 201510519935.5, filed on Aug. 21 2015, which is hereby incorporated by reference in its entirety.

TECHNICAL FIELD

Embodiments of the present invention relate to the communications field, and in particular, to a task handoff method and a related device.

BACKGROUND

Multiple-device interaction rises in contrast to a development bottleneck encountered by single-device application. Currently, full-touchscreen smartphones and tablet devices have reached a saturation degree, and users are used to handing off between multiple screens; however, many products do not allow the users to freely hand off between multiple devices.

In a use scenario of multiple devices, to enable the multiple devices as a whole to intelligently deliver optimal experience to a consumer, Apple Inc. performs in-depth fusion and interactive connection on a Mac OS on a computer and an iOS system on a mobile terminal, so that by using a handoff (handoff) function, a user who previously writes an email on an iPhone can continue writing the email on a Mac, or a user who previously browses a webpage on a Mac can continue browsing the same page on an iPad. Provided that the user logs in to a same iCloud account on the devices and the devices are approaching each other, everything may be performed automatically.

During implementation of task handoff by using the handoff function, the following disadvantages are found: When a user is browsing a webpage or watching a video on a Mac, and another user is using the user's iPad, the another user may perceive, on the iPad, an operation performed by the user because content that is currently displayed on the Mac may be synchronized to the iPad by using the handoff function, which may lead to privacy disclosure. In another aspect, when the user is editing an email on the Mac and leaves for a while, a child may play on the iPad, which may result in loss of content of the email being edited by the user.

SUMMARY

Embodiments of the present invention provide a task handoff method and a related device, where the task handoff method and the related device are used to improve data security.

A first aspect of the present invention provides a task handoff method, including:

displaying, by a second device, prompt information, where the prompt information is used to inform a user that a task executed on a first device may be handed off to the second device for execution;

receiving, by the second device, a first operation of the user, and collecting a fingerprint used when the user performs the first operation, where the first operation is used to request execution of the task on the second device;

acquiring, by the second device, first fingerprint information and second fingerprint information by using the first device;

calculating, by the second device according to the fingerprint used when the user performs the first operation and the first fingerprint information, third fingerprint information; and executing, by the second device, the task when the third fingerprint information matches the second fingerprint information.

With reference to the first aspect of the present invention, in a first implementation manner of the first aspect of the present invention, the first fingerprint information is a sketch of a registered fingerprint of the user, and the second fingerprint information is a hash of the registered fingerprint of the user; and the calculating, by the second device according to the fingerprint used when the user performs the first operation and the first fingerprint information, third fingerprint information specifically includes:

restoring, by the second device, a fingerprint template according to the fingerprint used when the user performs the first operation and the sketch of the registered fingerprint of the user; and calculating, by the second device, a hash of the fingerprint template.

With reference to the first implementation manner of the first aspect of the present invention, in a second implementation manner of the first aspect of the present invention, the acquiring, by the second device, first fingerprint information and second fingerprint information by using the first device specifically includes:

requesting, by the second device from the first device, the sketch and the hash of the registered fingerprint of the user; and receiving, by the second device, the sketch and the hash that are of the registered fingerprint of the user and that are sent by the first device.

With reference to the first implementation manner of the first aspect of the present invention, in a third implementation manner of the first aspect of the present invention, the acquiring, by the second device, first fingerprint information and second fingerprint information by using the first device specifically includes:

acquiring, by the second device, the sketch and the hash that are of the registered fingerprint of the user and that are synchronized from a cloud server, where the cloud server is associated with a login account of the first device, and a login account of the second device and the login account of the first device are the same.

A second aspect of the present invention provides a task handoff method, including:

displaying, by a second device, prompt information, where the prompt information is used to inform a user that a task executed on a first device may be handed off to the second device for execution;

receiving, by the second device, a first operation performed by the user on the prompt information, and collecting a fingerprint used when the user performs the first operation, where the first operation is used to request execution of the task on the second device; and executing, by the second device, the task when the fingerprint used when the user performs the first operation matches fingerprint information that is of a registered fingerprint of the user and that is stored in a local storage of the second device.

With reference to the second aspect of the present invention, in a first implementation manner of the second aspect of the present invention, the first operation includes at least one of the following operation manners: tap, press, slide, rotation, or twist.

A third aspect of the present invention provides a task handoff method, including:

receiving, by a second device, first fingerprint information and second fingerprint information that are generated by a first device according to the second device selected by a user;

displaying, by the second device, prompt information, where the prompt information is used to inform the user that a task executed on the first device may be handed off to the second device for execution;

receiving, by the second device, a first operation of the user, and collecting a fingerprint used when the user performs the first operation, where the first operation is used to request execution of the task on the second device;

calculating, by the second device according to the fingerprint used when the user performs the first operation and the first fingerprint information, third fingerprint information; and executing, by the second device, the task when the third fingerprint information matches the second fingerprint information.

With reference to the third aspect of the present invention, in a first implementation manner of the third aspect of the present invention, the first fingerprint information is a sketch of a first fingerprint of the user, and the second fingerprint information is a hash of the first fingerprint of the user; and the calculating, by the second device according to the fingerprint used when the user performs the first operation and the first fingerprint information, third fingerprint information specifically includes:

restoring, by the second device, a fingerprint template according to the fingerprint used when the user performs the first operation and the sketch of the first fingerprint of the user; and calculating, by the second device, a hash of the fingerprint template.

A fourth aspect of the present invention provides a task handoff method, including:

pre-storing, by a first device, fingerprint information of a registered fingerprint of a user, and associating the fingerprint information of the registered fingerprint of the user with a task handoff function;

when the user triggers the task handoff function, collecting, by the first device, a fingerprint input by the user; and when the fingerprint input by the user matches the fingerprint information of the registered fingerprint of the user, acquiring, by the first device, information about multiple adjacent devices, so that the user can select, from the multiple adjacent devices, a second device for performing task handoff; where a login account of the first device and a login account of the second device are different, and the information about the multiple adjacent devices includes respective login accounts of the multiple adjacent devices.

With reference to the fourth aspect of the present invention, in a first implementation manner of the fourth aspect of the present invention, the acquiring, by the first device, information about multiple adjacent devices, so that the user can select, from the multiple adjacent devices, a second device for performing task handoff specifically includes:

acquiring, by the first device, identifiers of the multiple adjacent devices by using Bluetooth or Wireless Fidelity WI-FI;

uploading, by the first device, the identifiers of the multiple adjacent devices to a cloud server, and requesting, from the cloud server, login accounts of devices corresponding to the identifiers, where the cloud server is associated with the login account of the first device;

acquiring, by the first device, the login accounts sent by the cloud server, so that the user can select, from the multiple adjacent devices, the second device according to the login accounts; and establishing, by the first device, a connection to the second device by using the cloud server, and performing task handoff with the second device.

With reference to the fourth aspect of the present invention, in a second implementation manner of the fourth aspect of the present invention, the acquiring, by the first device, information about multiple adjacent devices, so that the user can select, from the multiple adjacent devices, a second device for performing task handoff specifically includes:

requesting, by the first device from a cloud server, a login account of an online device, where the cloud server is associated with the login account of the first device, and the login account of the online device is stored in family sharing of the cloud server;

acquiring, by the first device, the login account sent by the cloud server, so that the user can select, from the online device, the second device according to the login account; and establishing, by the first device, a connection to the second device by using the cloud server, and performing task handoff with the second device.

A fifth aspect of the present invention provides a task handoff device, where the task handoff device is a second device, and includes:

a display unit, configured to display prompt information, where the prompt information is used to inform a user that a task executed on a first device may be handed off to the second device for execution;

a collection unit, configured to: receive a first operation of the user, and collect a fingerprint used when the user performs the first operation, where the first operation is used to request execution of the task on the second device;

an acquiring unit, configured to acquire first fingerprint information and second fingerprint information by using the first device;

a calculation unit, configured to calculate, according to the fingerprint used when the user performs the first operation and the first fingerprint information, third fingerprint information; and an execution unit, configured to execute the task when the third fingerprint information matches the second fingerprint information.

With reference to the fifth aspect of the present invention, in a first implementation manner of the fifth aspect of the present invention, the first fingerprint information is a sketch of a registered fingerprint of the user, and the second fingerprint information is a hash of the registered fingerprint of the user; and the calculation unit specifically includes:

a restoration subunit, configured to restore a fingerprint template according to the fingerprint used when the user performs the first operation and the sketch of the registered fingerprint of the user; and a calculation subunit, configured to calculate a hash of the fingerprint template.

With reference to the first implementation manner of the fifth aspect of the present invention, in a second implementation manner of the fifth aspect of the present invention, the acquiring unit specifically includes:

a request subunit, configured to request, from the first device, the sketch and the hash of the registered fingerprint of the user; and a receiving subunit, configured to receive the sketch and the hash that are of the registered fingerprint of the user and that are sent by the first device.

With reference to the first implementation manner of the fifth aspect of the present invention, in a third implementation manner of the fifth aspect of the present invention, the acquiring unit is specifically configured to acquire the sketch and the hash that are of the registered fingerprint of the user and that are synchronized from a cloud server, where the cloud server is associated with a login account of the first device, and a login account of the second device and the login account of the first device are the same.

A sixth aspect of the present invention provides a task handoff device, where the task handoff device is a second device, and includes:

a display unit, configured to display prompt information, where the prompt information is used to inform a user that a task executed on a first device may be handed off to the second device for execution;

a collection unit, configured to: receive a first operation performed by the user on the prompt information, and collect a fingerprint used when the user performs the first operation, where the first operation is used to request the task on the second device; and an execution unit, configured to execute the task when the fingerprint used when the user performs the first operation matches fingerprint information that is of a registered fingerprint of the user and that is stored in a local storage of the second device.

With reference to the sixth aspect of the present invention, in a first implementation manner of the sixth aspect of the present invention, the first operation includes at least one of the following operation manners: tap, press, slide, rotation, or twist.

A seventh aspect of the present invention provides a task handoff device, where the task handoff device is a second device, and includes:

a receiving unit, configured to receive first fingerprint information and second fingerprint information that are generated by a first device according to the second device selected by a user;

a display unit, configured to display prompt information, where the prompt information is used to inform the user that a task executed on the first device may be handed off to the second device for execution;

a collection unit, configured to: receive a first operation of the user, and collect a fingerprint used when the user performs the first operation, where the first operation is used to request execution of the task on the second device;

a calculation unit, configured to calculate, according to the fingerprint used when the user performs the first operation and the first fingerprint information, third fingerprint information; and an execution unit, configured to execute the task when the third fingerprint information matches the second fingerprint information.

With reference to the seventh aspect of the present invention, in a first implementation manner of the seventh aspect of the present invention, the first fingerprint information is a sketch of a first fingerprint of the user, and the second fingerprint information is a hash of the first fingerprint of the user; and the calculation unit specifically includes:

a restoration subunit, configured to restore a fingerprint template according to the fingerprint used when the user performs the first operation and the sketch of the first fingerprint of the user; and a calculation subunit, configured to calculate a hash of the fingerprint template.

An eighth aspect of the present invention provides a task handoff device, where the task handoff device is a first device, and includes:

a storage unit, configured to: pre-store fingerprint information of a registered fingerprint of a user, and associate the fingerprint information of the registered fingerprint of the user with a task handoff function;

a collection unit, configured to: when the user triggers the task handoff function, collect a fingerprint input by the user; and a processing unit, configured to: when the fingerprint input by the user matches the fingerprint information of the registered fingerprint of the user, acquire information about multiple adjacent devices, so that the user can select, from the multiple adjacent devices, a second device for performing task handoff; where a login account of the first device and a login account of the second device are different, and the information about the multiple adjacent devices includes respective login accounts of the multiple adjacent devices.

With reference to the eighth aspect of the present invention, in a first implementation manner of the eighth aspect of the present invention, the processing unit specifically includes:

a first acquiring subunit, configured to: when the fingerprint input by the user matches the fingerprint information of the registered fingerprint of the user, acquire identifiers of the multiple adjacent devices by using Bluetooth or Wireless Fidelity WI-FI;

an uploading subunit, configured to: upload the identifiers of the multiple adjacent devices to a cloud server, and request, from the cloud server, login accounts of devices corresponding to the identifiers, where the cloud server is associated with the login account of the first device;

a second acquiring subunit, configured to acquire the login accounts sent by the cloud server, so that the user can select, from the multiple adjacent devices, the second device according to the login accounts; and an establishment subunit, configured to: establish a connection to the second device by using the cloud server, and perform task handoff with the second device.

With reference to the eighth aspect of the present invention, in a second implementation manner of the eighth aspect of the present invention, the processing unit specifically includes:

a request subunit, configured to: when the fingerprint input by the user matches the fingerprint information of the registered fingerprint of the user, request, from a cloud server, a login account of an online device, where the cloud server is associated with the login account of the first device, and the login account of the online device is stored in family sharing of the cloud server;

an acquiring subunit, configured to acquire the login account sent by the cloud server, so that the user can select, from the online device, the second device according to the login account; and an establishment subunit, configured to: establish a connection to the second device by using the cloud server, and perform task handoff with the second device.

As can be seen from the foregoing technical solutions, the present invention has the following advantages: the second device receives a first operation of a user, and collects a fingerprint used when the user performs the first operation, where the first operation is used to request execution of the task on the second device; the second device acquires first fingerprint information and second fingerprint information by using the first device; the second device calculates, according to the fingerprint used when the user performs the first operation and the first fingerprint information, third fingerprint information; and the second device executes the task when the third fingerprint information matches the second fingerprint information. In this way, another device or user is prevented from acquiring and executing the task executed on the first device during task handoff, thereby avoiding privacy disclosure or a data content loss and improving data security.

DESCRIPTION OF EMBODIMENTS

Figure 1:
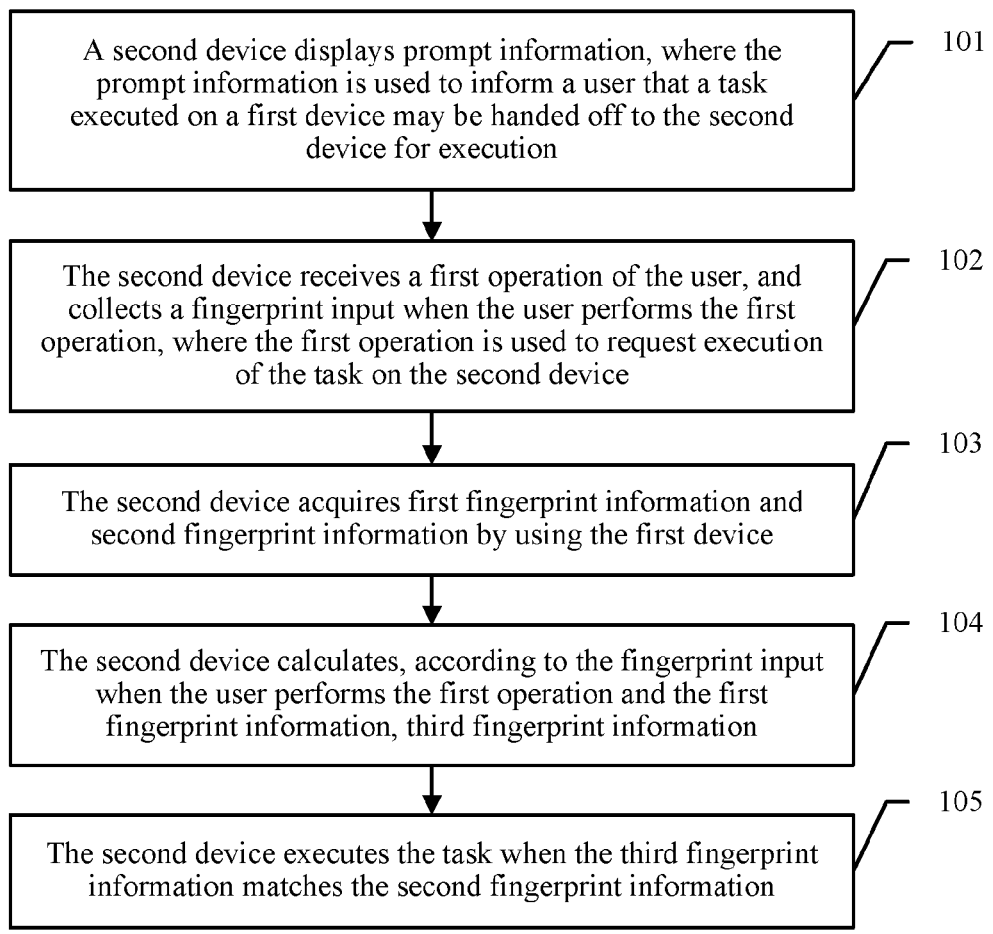
FIG. 1 is a schematic flowchart of an embodiment of a task handoff method according to the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

It should be understood that although terms "first" and "second" are used in the embodiments of the present invention to describe users or terminals, the users or the terminals are not limited by these terms. These terms are merely used to differentiate the users or the terminals. For example, without departing from the scope of the embodiments of the present invention, a first user may also be referred to as a second user, and similarly, the second user may also be referred to as the first user; likewise, the second user may also be referred to as a third user, which is not limited in the embodiments of the present invention.

To resolve a problem of disclosure of user privacy caused by a handoff function in actual application, the present invention provides a task handoff method, and the method is executed on a task handoff device. Some basic knowledge involved in the present invention is described first.

(1) A fingerprint recognition system generally includes the following several parts:

Image acquisition: A fingerprint image is acquired by using a special fingerprint collector or scanner, a digital camera, a smartphone, or the like.

Image compression: An image in a fingerprint database is compressed and then stored, so as to reduce storage space.

Image processing: which refers to fingerprint area detection, image quality judgment, estimation of a directional diagram and frequency estimation, image enhancement, fingerprint image binarization and refinement, and the like.

Extraction of a fingerprint pattern and a minutiae feature: A fingerprint feature is acquired and submitted to a next step for analysis. A fingerprint pattern feature includes a center (up and down) and a trigonometrical point (left and right), and the like. The minutiae feature mainly includes a start point, an end point, a joint point and a bifurcation point.

Fingerprint comparison: Two or more fingerprints are compared, so as to analyze the two or more fingerprints are from a same fingerprint source.

(2) For handling noise generated during fingerprint scanning, there is a secure sketch technology, which is specifically described as follows: During a registration phase, an encoding module performs encoding on a fingerprint X, and a sketch P is generated; during a decoding phase, the sketch P may rectify a similar fingerprint X' to X. In this way, X may be denoised; and information of the fingerprint cannot be deduced from the sketch P.

A brief process: (1) After a key point is acquired from the fingerprint, a random point is added to a point set, and the sketch P is calculated; (2) a hash value of the key point acquired from the fingerprint is calculated; (3) a fingerprint template is restored according to a fingerprint input by a user and the sketch P, and a hash value of the fingerprint template is calculated; (4) whether the hash value of the fingerprint template matches the hash value of the key point acquired from the fingerprint is verified.

A specific process of a task handoff method provided in the present invention is as follows, and referring to FIG. 1, an embodiment of the task handoff method provided in the present invention includes the following steps:

101. A second device displays prompt information, where the prompt information is used to inform a user that a task executed on a first device may be handed off to the second device for execution.

It should be noted that the second device or the first device includes but is not limited to a mobile terminal or a wearable device, such as a mobile phone, a portable computer, a tablet computer, a personal digital assistant (Personal Digital Assistant, PDA), a media player, a smart television, a smart watch, smart glasses, a smart band. The second device displays the prompt information, where the prompt information is used to inform the user that the task executed on the first device may be handed off to the second device for execution. For example, content of an email is edited on a first device iPhone, and prompt information is displayed on a second device iPad by using a handoff function, where the prompt information is used to inform the user that a task of editing the email on the first device iPhone may be handed off to the second device iPad for execution. The handoff function may be triggered by performing any one of the following operations or a combination of multiple operations: tap, press, slide, rotation, twist, voice input, or voice-print input.

The prompt information may be presented in the form of an icon, for example, a corner mark or a badge, a prompt box, or a lock. For example, the second device iPad presents an email icon, so as to inform the user that the task of editing the email on the first device iPhone may be handed off to the second device iPad for execution. Optionally, the prompt information may be an application screenshot of a multi-task interface, which is not specifically limited herein.

102. The second device receives a first operation of the user, and collects a fingerprint used when the user performs the first operation, where the first operation is used to request execution of the task on the second device.

It should be noted that the first operation may include at least one of the following operation manners: tap, press, slide, rotation, or twist.

The second device collects the fingerprint used when the user performs the first operation. Specifically, it may be collected by using a fingerprint recognition sensor or an iris sensor in the second device. For example, the user inputs a fingerprint on the second device iPad, where input may be implemented in a manner of pressing a key or touching a screen, which is not specifically limited herein. The fingerprint recognition sensor collects the fingerprint used when the user performs the first operation. The fingerprint recognition sensor may collect texture information (including fingerprint information, palm print information, and the like) of a body surface of a part of the user touching the fingerprint sensor, and convert the texture information to an executable command in an electrical signal form, where the fingerprint sensor may include a capacitance fingerprint sensor, an ultrasonic fingerprint sensor, an optical fingerprint sensor, or a temperature fingerprint sensor, and may be a slide-type fingerprint sensor, or may be a press-type fingerprint sensor. The iris sensor may collect iris information of the user, and convert the iris information to a command that is in an electrical signal form and can be executed by a processing unit. The iris sensor may reuse the foregoing camera by means of adding a light filter, or a special iris sensor may be separately added.

103. The second device acquires first fingerprint information and second fingerprint information by using the first device.

104. The second device calculates, according to the fingerprint used when the user performs the first operation and the first fingerprint information, third fingerprint information.

It should be noted that the second device calculates, according to the fingerprint used when the user performs the first operation and the first fingerprint information, the third fingerprint information. For example, the second device iPad calculates, according to the fingerprint used when the user performs the first operation on the iPad and with reference to the first fingerprint information, the third fingerprint information.

105. The second device executes the task when the third fingerprint information matches the second fingerprint information.

It should be noted that the second device executes the task when the third fingerprint information matches the second fingerprint information. For example, the second device iPad determines whether the third fingerprint information matches the second fingerprint information. If it matches, fingerprint verification succeeds. When the email icon presented by the foregoing prompt information is slid upward by a finger, an app that is on the second device iPad and corresponding to the handed-off task is enabled, and the second device iPad displays and executes a task that is the same as that on the first device iPhone. If the third fingerprint information does not match the second fingerprint information, fingerprint verification fails, and the second device iPad cannot execute a task that is the same as that on the first device iPhone.

In this embodiment of the present invention, a second device receives a first operation of a user, and collects a fingerprint used when the user performs the first operation, where the first operation is used to request execution of a task on a second device; the second device acquires first fingerprint information and second fingerprint information by using the first device; the second device calculates, according to the fingerprint used when the user performs the first operation and the first fingerprint information, third fingerprint information; and the second device executes the task when the third fingerprint information matches the second fingerprint information. In this way, another device or user is prevented from acquiring and executing the task executed on the first device during task handoff, thereby avoiding privacy disclosure or a data content loss, and improving data security.

Figure 2:
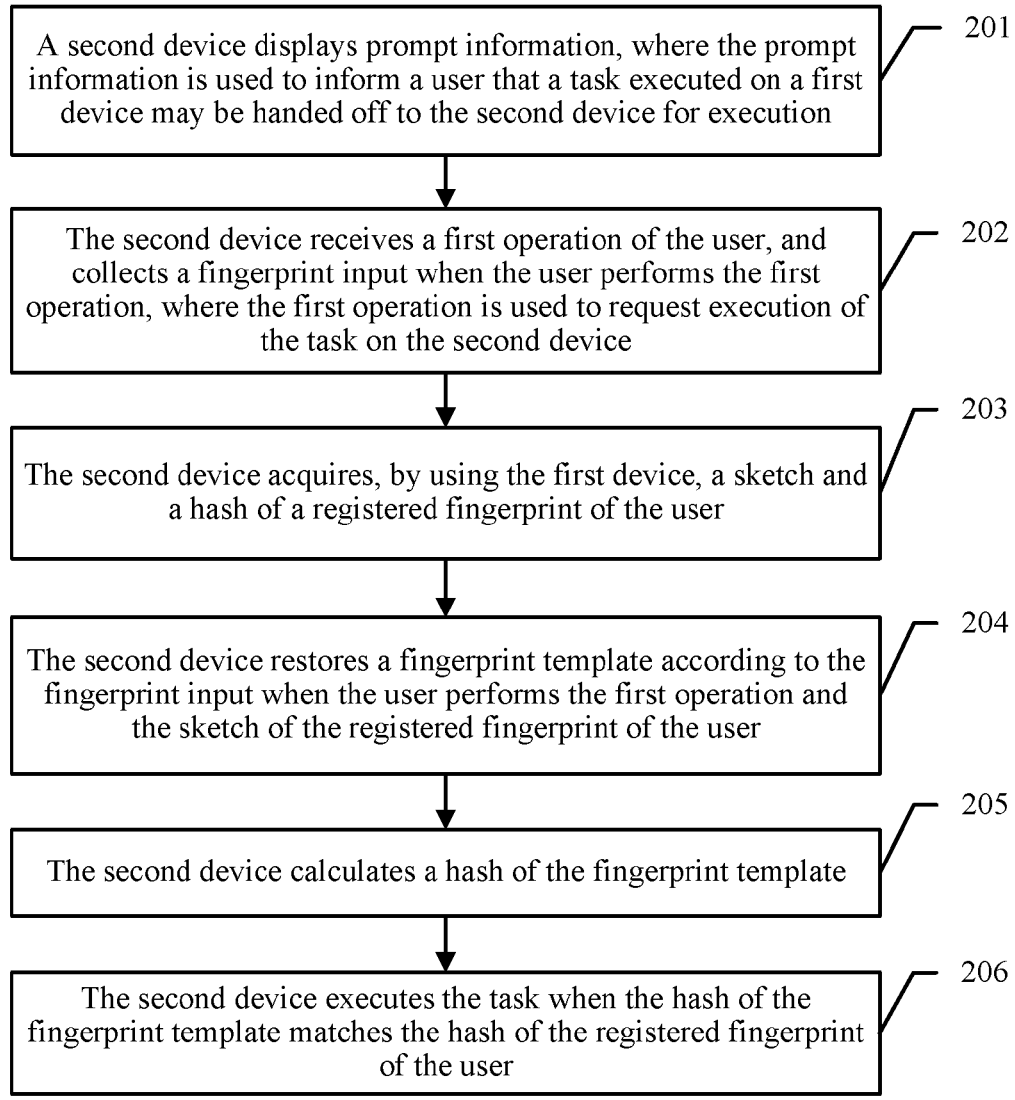
FIG. 2 is a schematic flowchart of another embodiment of a task handoff method according to the present invention.

Referring to FIG. 2, another embodiment of a task handoff method provided in the present invention includes the following steps:

201. A second device displays prompt information, where the prompt information is used to inform a user that a task executed on a first device may be handed off to the second device for execution.

202. The second device receives a first operation of the user, and collects a fingerprint used when the user performs the first operation, where the first operation is used to request execution of the task on the second device.

For steps 201 and 202, reference may be made to steps 101 and 102, and details are not described herein.

203. The second device acquires, by using the first device, a sketch and a hash of a registered fingerprint of the user.

It should be noted that the second device acquires, by using the first device, the sketch and the hash of the registered fingerprint of the user; the user registers a fingerprint on the first device, and during full screen fingerprint recognition, multiple fingerprints may be collected and registered at a time; during non-full screen fingerprint recognition, the fingerprints needs to be registered one by one. For example, the user registers fingerprint information of 10 fingers on a first device iPhone, where the registering fingerprint information of 10 fingers herein is merely exemplary. In actual application, a quantity of fingers whose fingerprint information is registered by a user is determined according to an operating system of a mobile terminal/device, and if the operating system of the mobile terminal/device allows the user to register fingerprint information of three fingers, the user can register fingerprint information of three fingers only; a quantity of fingerprints and a fingerprint type are not limited herein.

204. The second device restores a fingerprint template according to the fingerprint used when the user performs the first operation and the sketch of the registered fingerprint of the user.

It should be noted that the second device restores the fingerprint template according to the fingerprint used when the user performs the first operation and the sketch of the registered fingerprint of the user. For example, a second device iPad restores a fingerprint template according to a spot fingerprint used when the user performs the first operation on the iPad and with reference to fingerprint sketches of 10 fingers registered by the user on the first device iPhone that are acquired in step 203.

205. The second device calculates a hash of the fingerprint template.

It should be noted that the second device calculates the hash of the fingerprint template according to the restored fingerprint template.

206. The second device executes the task when the hash of the fingerprint template matches the hash of the registered fingerprint of the user.

It should be noted that the second device executes the task when the hash of the fingerprint template matches the hash of the registered fingerprint of the user. For example, it is determined whether the hash of the restored fingerprint template in step 204 matches the acquired hash of the registered fingerprint of the user. If the hash of the restored fingerprint template in step 204 matches the acquired hash of the registered fingerprint of the user, fingerprint verification succeeds. When an email icon is slid upward by a finger, an app that is on the second device iPad and corresponding to a handed-off task is enabled, and the second device iPad displays and executes a task that is the same as that on the first device iPhone. If the hash of the restored fingerprint template in step 204 does not match the acquired hash of the registered fingerprint of the user, fingerprint verification fails, and the second device iPad cannot execute a task that is the same as that on the first device iPhone.

In this embodiment of the present invention, a second device acquires, by using a first device, a sketch and a hash of a registered fingerprint of a user, and restores a fingerprint template according to a fingerprint input when the user performs a first operation and the sketch of the registered fingerprint of the user; the second device calculates a hash of the fingerprint template; and the second device executes a task when the hash of the fingerprint template matches the hash of the registered fingerprint of the user. In this way, another device or user is prevented from acquiring and executing the task executed on the first device during task handoff, thereby avoiding privacy disclosure or a data content loss and improving data security.

Further, in a use process, the inventor also finds the following: It is assumed that the user is editing an email on a mobile phone that nearly runs out of power and needs to hand off, by using a handoff function, to another device, if the user logs in to the another device of the user by using another Apple ID account, content of the email cannot be handed off to the another device that is logged in by using the another Apple ID account. To resolve a problem of function limitation and inflexibility that an existing handoff function allows use of a same Apple ID account and cannot be extended to allow use of different Apple ID accounts, the present invention provides the following method.

Figure 3:
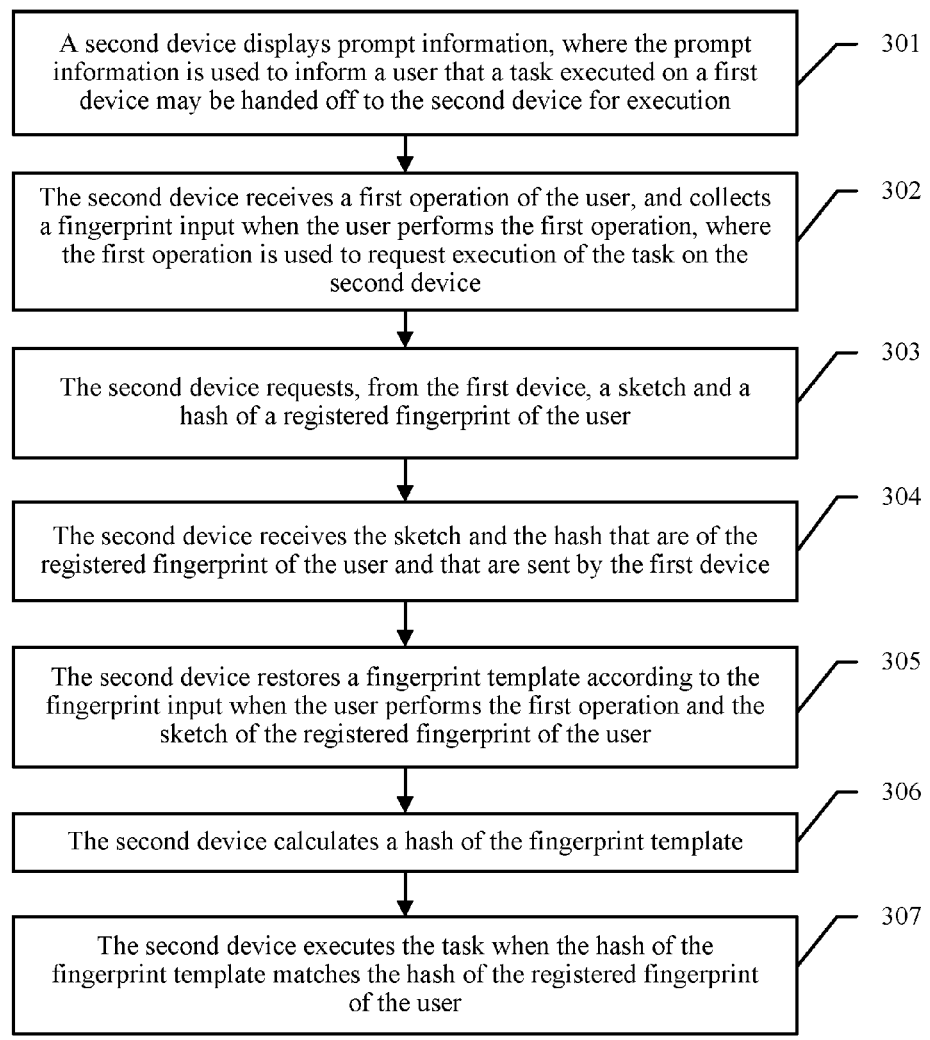
FIG. 3 is a schematic flowchart of another embodiment of a task handoff method according to the present invention.

Referring to FIG. 3, another embodiment of a task handoff method provided in the present invention includes the following steps:

301. A second device displays prompt information, where the prompt information is used to inform a user that a task executed on a first device may be handed off to the second device for execution.

Reference may be made to a related description in step 102. It needs to be additionally noted that a login account of the second device and a login account of the first device may be the same or may be different. For example, if a same iCloud account is used to log in to a first device iPhone and a second device iPad, a current task on the first device iPhone is automatically synchronized to the adjacent second device iPad; if different iCloud accounts are used to log in to a first device iPhone and a second device iPad, fingerprint information stored in the first device iPhone is associated with a handoff function in advance, and association information is stored. A touch performed by a finger on a handoff function key is detected on the first device iPhone, and a fingerprint image of the operating finger of the user is acquired, and then whether a fingerprint matches the fingerprint information stored in the first device iPhone is verified; if the fingerprint matches the fingerprint information stored in the first device iPhone, it is determined that the current task on the first device iPhone is synchronized to the adjacent device. The iPhone acquires information about multiple adjacent devices, including information about Apple IDs used to log in to the multiple adjacent devices. The iPhone presents the Apple IDs of the multiple adjacent devices, so that the user can select an adjacent device to which the current task is to be synchronized. The user selects Apple ID information of the second device iPad, so as to synchronize the current task on the iPhone to the adjacent iPad.

302. The second device receives a first operation of the user, and collects a fingerprint used when the user performs the first operation, where the first operation is used to request execution of the task on the second device.

Reference may be made to a related description in step 102, and details are not described herein.

303. The second device requests, from the first device, a sketch and a hash of a registered fingerprint of the user.

It should be noted that the second device initiates a request to the first device, so as to request for the sketch and the hash of the registered fingerprint of the user.

304. The second device receives the sketch and the hash that are of the registered fingerprint of the user and that are sent by the first device.

It should be noted that the second device receives the sketch and the hash that are of the registered fingerprint of the user and that are sent by the first device. For example, the second device iPad receives sketches and hashes that are of 10 fingerprints that have been registered by the user and that are securely transmitted by the first device iPhone.

305. The second device restores a fingerprint template according to the fingerprint used when the user performs the first operation and the sketch of the registered fingerprint of the user.

306. The second device calculates a hash of the fingerprint template.

307. The second device executes the task when the hash of the fingerprint template matches the hash of the registered fingerprint of the user.

For steps 305, 306, and 307, reference may be made to related descriptions in steps 204, 205, and 206, and details are not described herein.

In this embodiment of the present invention, a second device receives a sketch and a hash that are of a registered fingerprint of a user and that are sent by a first device, and restores a fingerprint template according to a fingerprint input when the user performs a first operation and the sketch of the registered fingerprint of the user; the second device calculates a hash of the fingerprint template; and the second device executes a task when the hash of the fingerprint template matches the hash of the registered fingerprint of the user. In this way, another device or user is prevented from acquiring and executing the task executed on the first device during task handoff, thereby avoiding privacy disclosure or a data content loss and improving data security. In addition, in the present invention, a login account of the second device and a login account of the first device may be the same or may be different, and a fingerprint does not need to be registered on the second device either, which has better flexibility and greatly improves user experience.

Figure 4:
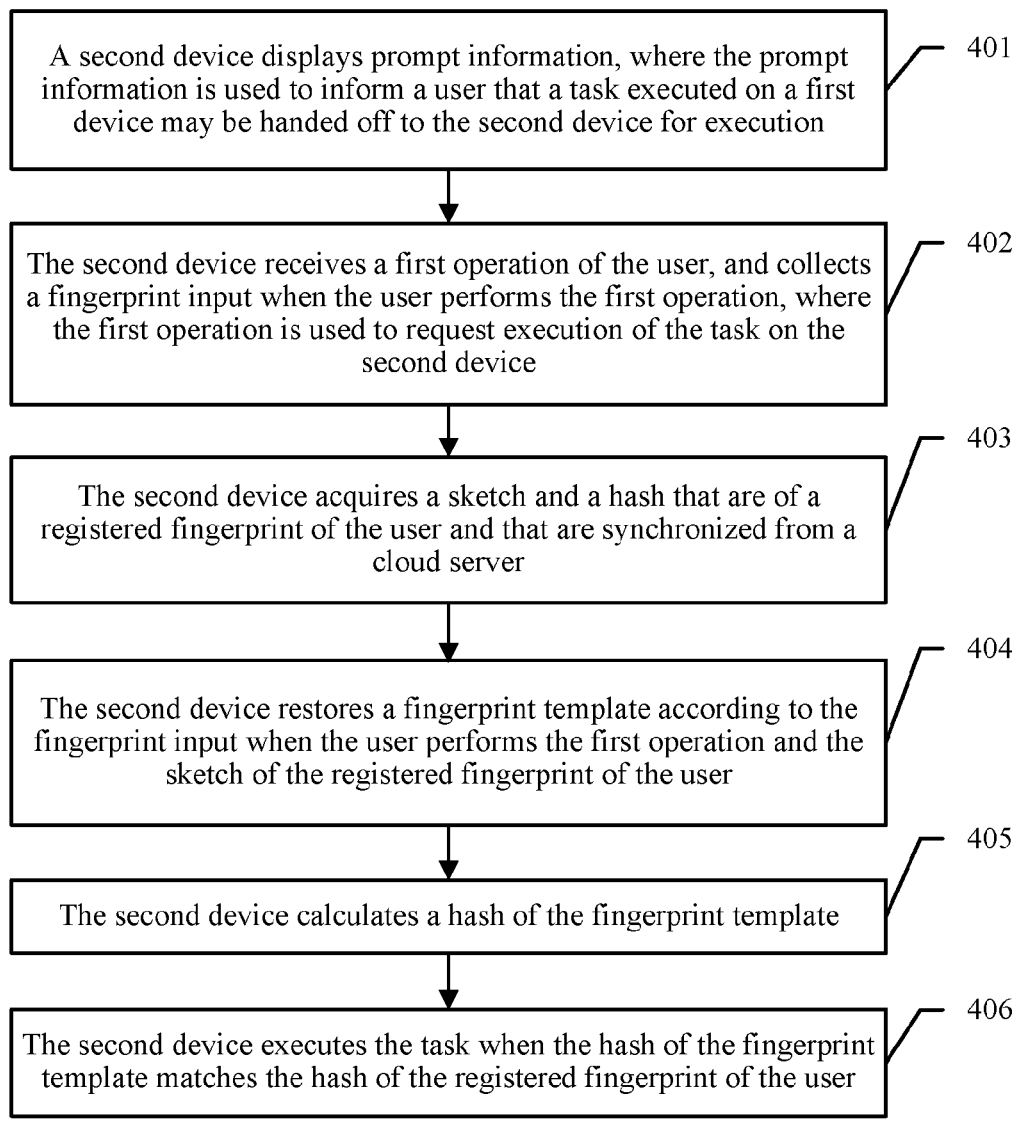
FIG. 4 is a schematic flowchart of another embodiment of a task handoff method according to the present invention.

Referring to FIG. 4, another embodiment of a task handoff method provided in the present invention includes the following steps:

401. A second device displays prompt information, where the prompt information is used to inform a user that a task executed on a first device may be handed off to the second device for execution.

402. The second device receives a first operation of the user, and collects a fingerprint used when the user performs the first operation, where the first operation is used to request execution of the task on the second device.

For steps 401 and 402, reference may be made to related descriptions in steps 101 and 102, and details are not described herein.

403. The second device acquires a sketch and a hash that are of a registered fingerprint of the user and that are synchronized from a cloud server.

It should be noted that the second device acquires the sketch and the hash that are of the registered fingerprint of the user and that are synchronized from the cloud server, where the cloud server is associated with a login account of the first device, and a login account of the second device and the login account of the first device are the same. For example, the user registers fingerprint information of 10 fingers on a first device iPhone, where the registering fingerprint information of 10 fingers herein is merely exemplary. In actual application, a quantity of fingers whose fingerprint information is registered by a user is determined according to an operating system of a mobile terminal/device. If the operating system of the mobile terminal/device allows the user to register fingerprint information of three fingers, the user can only register fingerprint information of three fingers, and a fingerprint quantity and a fingerprint type are not limited herein. The first device iPhone synchronizes fingerprint sketches and hashes in the fingerprint information to a cloud server iCloud, the cloud server iCloud is associated with a login account Apple ID of the iPhone, and the cloud server iCloud synchronizes in advance the fingerprint sketches and hashes to a device that is logged in by using a same Apple ID.

Further, the user may set, according to the user's requirement, a policy for synchronizing a sketch, for example, the sketch may be synchronized to an iPad and a Mac from the iPhone, or may be synchronized to the iPhone from the iPad and the Mac. A device type is detected, and if the device type meets a policy requirement, the fingerprint sketches and hashes are synchronized by using the iCloud; if the device type does not meet the policy requirement, synchronization of the fingerprint sketches and hashes is not allowed, or verification of a user identity is requested, and the iCloud can be allowed to synchronize the fingerprint sketches and hashes only after the verification is passed.

404. The second device restores a fingerprint template according to the fingerprint used when the user performs the first operation and the sketch of the registered fingerprint of the user.

405. The second device calculates a hash of the fingerprint template.

406. The second device executes the task when the hash of the fingerprint template matches the hash of the registered fingerprint of the user.

For steps 404, 405, and 406, reference may be made to related descriptions in steps 204, 205, and 206, and details are not described herein.

In this embodiment of the present invention, a second device acquires a sketch and a hash that are of a registered fingerprint of a user and that are synchronized from a cloud server, and restores a fingerprint template according to a fingerprint input when the user performs a first operation and the sketch of the registered fingerprint of the user; the second device calculates a hash of the fingerprint template; and the second device executes a task when the hash of the fingerprint template matches the hash of the registered fingerprint of the user. In this way, another device or user is prevented from acquiring and executing the task executed on the first device during task handoff, thereby avoiding privacy disclosure or a data content loss and improving data security.

Figure 5:
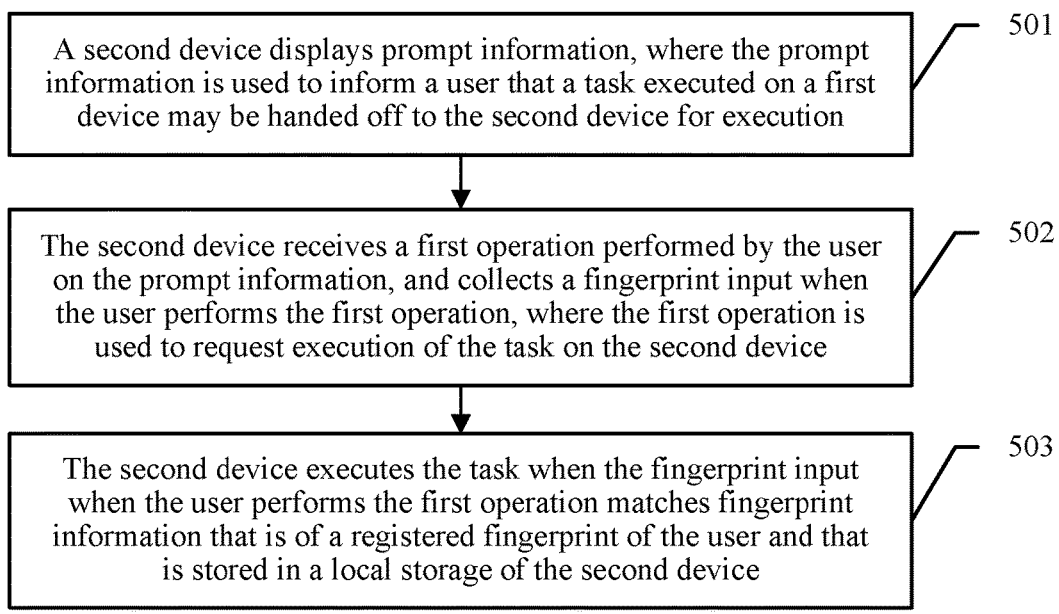
FIG. 5 is a schematic flowchart of another embodiment of a task handoff method according to the present invention.

Referring to FIG. 5, another embodiment of a task handoff method provided in the present invention includes the following steps:

501. A second device displays prompt information, where the prompt information is used to inform a user that a task executed on a first device may be handed off to the second device for execution.

It should be noted that the second device displays the prompt information, where the prompt information is used to inform the user that the task executed on the first device may be handed off to the second device for execution. For example, a second device iPad displays, on a lock screen interface, an email icon presented by prompt information, so as to inform the user that a task of editing an email on a first device iPhone may be handed off to the second device iPad for execution. Optionally, the prompt information may be an application screenshot of a multi-task interface, which is not specifically limited herein.

502. The second device receives a first operation performed by the user on the prompt information, and collects a fingerprint used when the user performs the first operation, where the first operation is used to request execution of the task on the second device.

It should be noted that the second device receives the first operation performed by the user on the prompt information, and collects the fingerprint used when the user performs the first operation, where the first operation is used to request execution of the task on the second device. For example, the user slides up, with a finger, the email icon presented by the foregoing prompt information, and during a process of sliding up the email icon, the second device iPad detects fingerprint information of the finger.

503. The second device executes the task when the fingerprint used when the user performs the first operation matches fingerprint information that is of a registered fingerprint of the user and that is stored in a local storage of the second device.

It should be noted that the second device executes the task when the fingerprint used when the user performs the first operation matches the fingerprint information that is of the registered fingerprint of the user and that is stored in the local storage of the second device. For example, the second device iPad determines whether fingerprint information matches fingerprint information that is of a registered fingerprint of the user and that is stored in a local storage of the second device iPad. if the fingerprint information matches the fingerprint information that is of the registered fingerprint of the user and that is stored in the local storage of the second device iPad, fingerprint verification succeeds. When an APP that is on the second device iPad and corresponding to the handed-off task is enabled, the second device iPad displays and executes a task that is the same as that on the first device iPhone. If the fingerprint information does not match the fingerprint information that is of the registered fingerprint of the user and that is stored in the local storage of the second device iPad, fingerprint verification fails, and the second device iPad cannot execute a task that is the same as that on the first device iPhone.

In this embodiment of the present invention, a second device displays prompt information; the second device receives a first operation performed by a user on the prompt information, and collects a fingerprint used when the user performs the first operation, where the first operation is used to request execution of a task on the second device; and the second device executes the task when the fingerprint used when the user performs the first operation matches fingerprint information that is of a registered fingerprint of the user and that is stored in a local storage of the second device. In this way, another device or user is prevented from acquiring and executing the task executed on a first device during task handoff, thereby avoiding privacy disclosure or a data content loss and improving data security.

Optionally, a login account of the second device and a login account of the first device are the same, and fingerprint information of a registered fingerprint of a same user is stored in a local storage of a device associated with the login account.

Optionally, the first operation includes at least one of the following operation manners: tap, press, slide, rotation, or twist.

Figure 6:
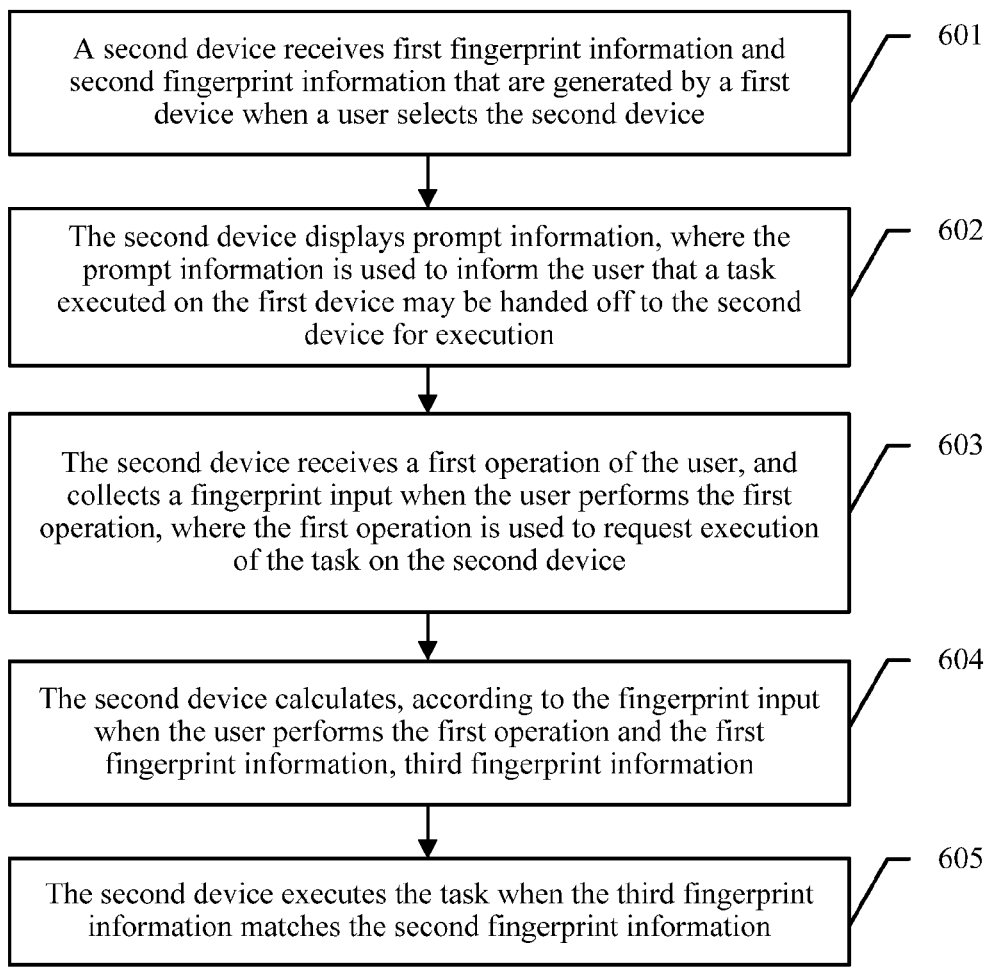
FIG. 6 is a schematic flowchart of another embodiment of a task handoff method according to the present invention.

Referring to FIG. 6, another embodiment of a task handoff method provided in the present invention includes the following steps:

601. A second device receives first fingerprint information and second fingerprint information that are generated by a first device according to the second device selected by a user.

It should be noted that the second device receives the first fingerprint information and the second fingerprint information that are generated by the first device according to the second device selected by the user. For example, a user uses a finger 1 to select an adjacent second device iPad on a first device iPhone, and a system on the iPhone informs that fingerprint information input by the user is "finger 1", or a pop-up is displayed for the user to select a finger that is used. Temporary first fingerprint information and second fingerprint information of the "finger 1" are generated on the iPhone, and the first fingerprint information and the second fingerprint information are transmitted to the iPad.

602. The second device displays prompt information, where the prompt information is used to inform the user that a task executed on the first device may be handed off to the second device for execution.

Reference may be made to a related description in step 101. It needs to be additionally noted that a login account of the second device and a login account of the first device may be the same or may be different. For example, if a same iCloud account is used to log in to the first device iPhone and the second device iPad, a current task on the first device iPhone is automatically synchronized to the adjacent second device iPad; if different iCloud accounts are used to log in to the first device iPhone and the second device iPad, a touch performed by the "finger 1" on a handoff function key is detected on the iPhone, a function for synchronizing the current task on the iPhone is enabled by the touch of the user's finger, and it is determined that the current task on the iPhone is to be synchronized to the adjacent device. The iPhone acquires information about multiple adjacent devices, including information about Apple IDs used to log in to the multiple adjacent devices. The iPhone presents the Apple IDs of the multiple adjacent devices, so that the user can select an adjacent device to which the current task is to be synchronized. If the user selects Apple ID information of the iPad, a current task of editing an email on the iPhone is synchronized to the adjacent iPad corresponding to the selected Apple ID information. The iPad presents the prompt information, where the prompt information is used to inform the user that the task executed on the first device may be handed off to the second device for execution, and the prompt information may be that: the user is clearly requested to input a fingerprint of the "finger 1".

603. The second device receives a first operation of the user, and collects a fingerprint used when the user performs the first operation, where the first operation is used to request execution of the task on the second device.

604. The second device calculates, according to the fingerprint used when the user performs the first operation and the first fingerprint information, third fingerprint information.

605. The second device executes the task when the third fingerprint information matches the second fingerprint information.

For steps 603, 604, and 605, reference may be made to related descriptions in steps 102, 104, and 105, and a difference lies in: Both the first device and the second device in this embodiment of the present invention do not need to store the first fingerprint information and the second fingerprint information; instead, the first fingerprint information and the second fingerprint information are generated as temporary fingerprint information to replace the stored first fingerprint information and second fingerprint information.

In this embodiment of the present invention, a second device receives first fingerprint information and second fingerprint information that are generated by a first device according to the second device selected by a user; the second device displays prompt information; the second device receives a first operation of the user, and collects a fingerprint used when the user performs the first operation, where the first operation is used to request execution of a task on the second device; the second device calculates, according to the fingerprint used when the user performs the first operation and the first fingerprint information, third fingerprint information; and the second device executes the task when the third fingerprint information matches the second fingerprint information. In this way, another device or user is prevented from acquiring and executing the task executed on the first device during task handoff, thereby avoiding privacy disclosure or a data content loss and improving data security. In addition, in the present invention, a login account of the second device and a login account of the first device may be the same or may be different, and a fingerprint does not need to be registered on the second device or the first device, which has better flexibility and greatly improves user experience.

Figure 7:
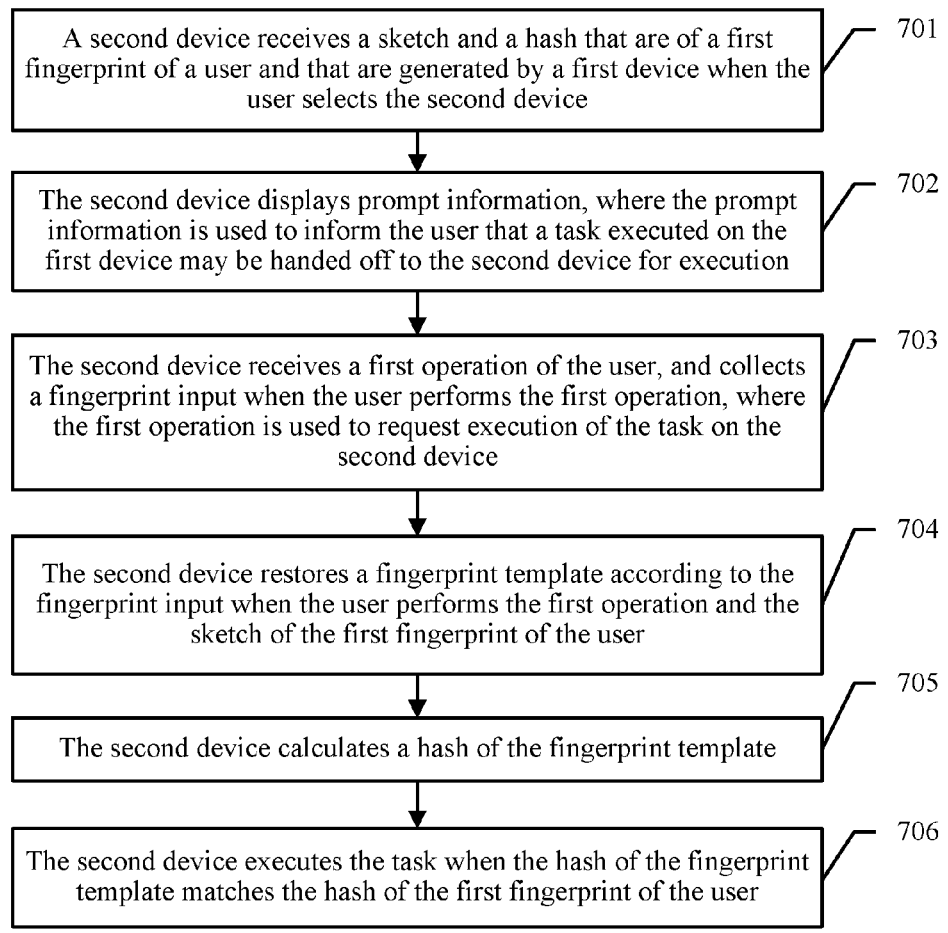
FIG. 7 is a schematic flowchart of another embodiment of a task handoff method according to the present invention.

Referring to FIG. 7, another embodiment of a task handoff method provided in the present invention includes the following steps:

701. A second device receives a sketch and a hash that are of a first fingerprint of a user and that are generated by a first device according to the second device selected by the user.

It should be noted that the second device receives the sketch and the hash that are of the first fingerprint of the user and that are generated by the first device according to the second device selected by the user. For example, the user uses a finger 1 to select an adjacent second device iPad on a first device iPhone, and a system on the iPhone informs that fingerprint information input by the user is "finger 1", or a pop-up is displayed for the user to select a finger that is used; a temporary fingerprint sketch and hash of the "finger 1" are generated on the iPhone, and the temporary fingerprint sketch and hash are transmitted to the iPad.

702. The second device displays prompt information, where the prompt information is used to inform the user that a task executed on the first device may be handed off to the second device for execution.

703. The second device receives a first operation of the user, and collects a fingerprint used when the user performs the first operation, where the first operation is used to request execution of the task on the second device.

For steps 702 and 703, reference may be made to related descriptions in steps 602 and 603, and details are not described herein.

704. The second device restores a fingerprint template according to the fingerprint used when the user performs the first operation and the sketch of the first fingerprint of the user.

It should be noted that the second device restores the fingerprint template according to the fingerprint used when the user performs the first operation and the sketch of the first fingerprint of the user. For example, the second device iPad restores a fingerprint template according to a spot fingerprint used when the user performs the first operation on the iPad and with reference to the temporary fingerprint sketch that is of the "finger 1" and that is generated in step 701.

705. The second device calculates a hash of the fingerprint template.

It should be noted that the second device calculates the hash of the fingerprint template according to the restored fingerprint template.

706. The second device executes the task when the hash of the fingerprint template matches the hash of the first fingerprint of the user.

For step 706, reference may be made to a related description in step 206, and a difference lies in: Both the first device and the second device in this embodiment of the present invention do not need to store a sketch and a hash of a registered fingerprint of the user; instead, the sketch and the hash of the first fingerprint are generated as a temporary sketch and hash to replace the sketch and the hash of the registered fingerprint of the user.

In this embodiment of the present invention, a second device receives a sketch and a hash that are of a first fingerprint of a user and that are generated by a first device according to the second device selected by the user; the second device displays prompt information; the second device receives a first operation of the user, and collects a fingerprint used when the user performs the first operation, where the first operation is used to request execution of the a on the second device; the second device restores a fingerprint template according to the fingerprint used when the user performs the first operation and the sketch of the first fingerprint of the user, and calculates a hash of the fingerprint template; and the second device executes the task when the hash of the fingerprint template matches the hash of the first fingerprint of the user. In this way, another device or user is prevented from acquiring and executing the task executed on the first device during task handoff, thereby avoiding privacy disclosure or a data content loss and improving data security. In addition, in the present invention, a login account of the second device and a login account of the first device may be the same or may be different, and a fingerprint does not need to be registered on the second device or the first device, which has better flexibility and greatly improves user experience.

Figure 8:
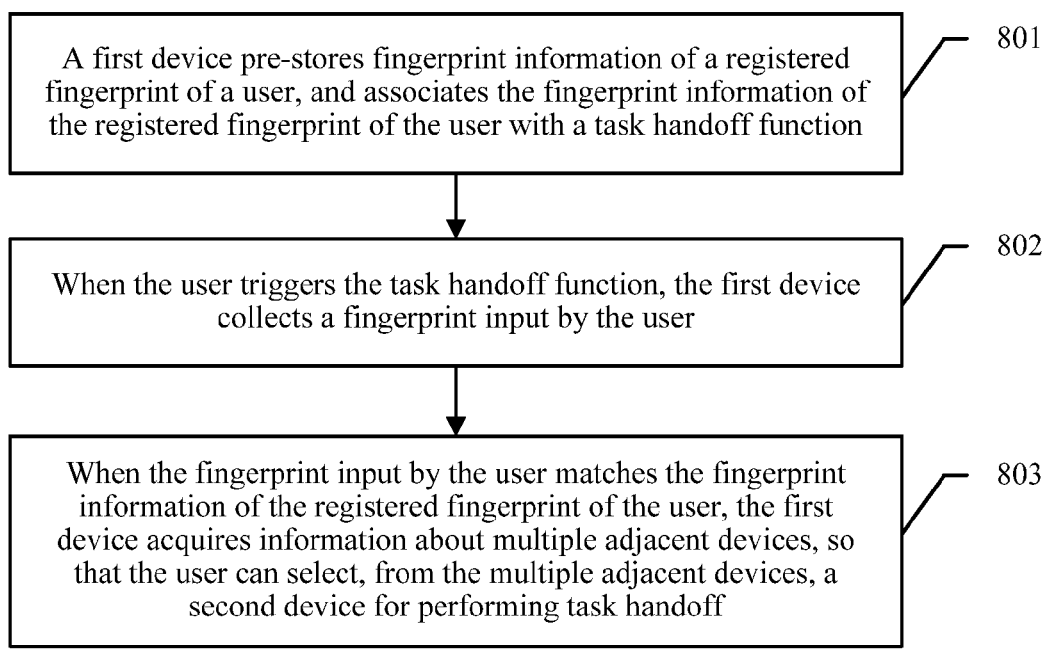
FIG. 8 is a schematic flowchart of another embodiment of a task handoff method according to the present invention.

From a perspective of a first device, referring to FIG. 8, another embodiment of a task handoff method provided in the present invention includes the following steps:

801. The first device pre-stores fingerprint information of a registered fingerprint of a user, and associates the fingerprint information of the registered fingerprint of the user with a task handoff function.

For example, fingerprint information of a registered fingerprint of a user is stored on a first device iPad, and the fingerprint information of the registered fingerprint of the user is associated with a task handoff handoff function, and then association information is stored.

802. When the user triggers the task handoff function, the first device collects a fingerprint input by the user.

For example, a touch performed by a finger of the user on a handoff function key is detected on the first device iPad, and a fingerprint image of the finger used by the user to operate is acquired.

803. When the fingerprint input by the user matches the fingerprint information of the registered fingerprint of the user, the first device acquires information about multiple adjacent devices, so that the user can select, from the multiple adjacent devices, a second device for performing task handoff.

It should be noted that when the fingerprint input by the user matches the fingerprint information of the registered fingerprint of the user, the first device acquires the information about the multiple adjacent devices, so that the user can select, from the multiple adjacent devices, the second device for performing task handoff, where a login account of the first device and a login account of the second device are different, and the information about the multiple adjacent devices includes respective login accounts of the multiple adjacent devices.

For example, the first device iPad verifies whether a fingerprint matches the fingerprint information stored in the iPad. If the fingerprint matches the fingerprint information stored in the iPad, it is determined that a current task on the iPad is synchronized to an adjacent device; the iPad acquires information about multiple adjacent devices, including information about Apple IDs used to log in to the multiple adjacent devices; the iPad presents the Apple IDs of the multiple adjacent devices, so that the user can select an adjacent device to which the current task is to be synchronized; the user selects to synchronize the current task on the iPad to an adjacent second device iPhone, and the iPhone presents an email icon, so as to inform the user that there is a task that can be handed off; a finger is used to slide upward prompt information on an iPhone screen, an app, on the iPhone, corresponding to the handed-off task is enabled, and the current task on the iPad is synchronized; the user continues the current task on the iPhone.

In this embodiment of the present invention, a first device pre-stores fingerprint information of a registered fingerprint of a user, and associates the fingerprint information of the registered fingerprint of the user with a task handoff function; when the user triggers the task handoff function, the first device collects a fingerprint input by the user; and when the fingerprint input by the user matches the fingerprint information of the registered fingerprint of the user, the first device acquires information about multiple adjacent devices, so that the user can select, from the multiple adjacent devices, a second device for performing task handoff. In this way, another device or user is prevented from acquiring and executing a task executed on the first device during task handoff, thereby avoiding privacy disclosure or a data content loss and improving data security; in addition, in the present invention, a login account of the second device and a login account of the first device may be the same or may be different, and a fingerprint does not need to be registered on the second device, which has better flexibility and greatly improves user experience.

Figure 9:
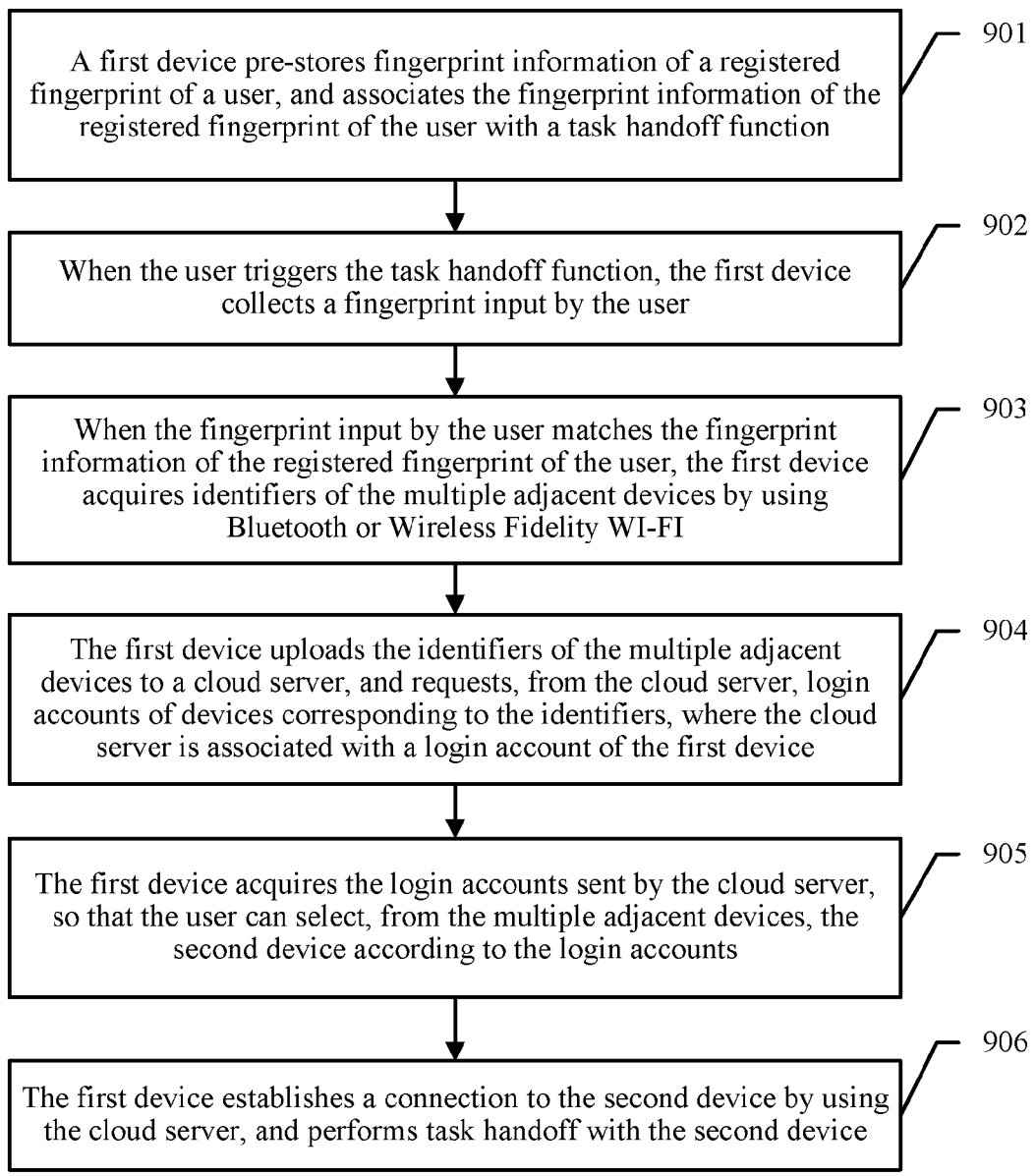
FIG. 9 is a schematic flowchart of another embodiment of a task handoff method according to the present invention.

Referring to FIG. 9, another embodiment of a task handoff method provided in the present invention includes the following steps:

901. A first device pre-stores fingerprint information of a registered fingerprint of a user, and associates the fingerprint information of the registered fingerprint of the user with a task handoff function.

902. When the user triggers the task handoff function, the first device collects a fingerprint input by the user.

For steps 901 and 902, reference may be made to steps 801 and 802, and details are not described herein.

903. When the fingerprint input by the user matches the fingerprint information of the registered fingerprint of the user, the first device acquires identifiers of the multiple adjacent devices by using Bluetooth or Wireless Fidelity WI-FI.

For example, a first device iPad discovers multiple adjacent devices by using Bluetooth or WiFi, and acquires identifiers of the multiple adjacent devices, such as a hash value of an Apple ID.

904. The first device uploads the identifiers of the multiple adjacent devices to a cloud server, and requests, from the cloud server, login accounts of devices corresponding to the identifiers, where the cloud server is associated with a login account of the first device.

For example, the first device iPad uploads the acquired identifiers of the multiple adjacent devices to a cloud server iCloud, where the acquired identifiers of the multiple adjacent devices are used to request login accounts Apple IDs respectively corresponding to the multiple adjacent devices; and after receiving a request sent by the iPad, the iCloud searches for the Apple IDs corresponding to the multiple identifiers.

905. The first device acquires the login accounts sent by the cloud server, so that the user can select, from the multiple adjacent devices, the second device according to the login accounts.

It should be noted that the first device acquires the login accounts sent by the cloud server, so that the user can select, from the multiple adjacent devices, the second device according to the login accounts, where the login account of the first device and a login account of the second device are different. For example, the cloud server iCloud sends an Apple ID corresponding to an adjacent device to the first device iPad, and the iPad presents the Apple IDs of the multiple adjacent devices, so that the user can select an adjacent device to which a current task is synchronized.

906. The first device establishes a connection to the second device by using the cloud server, and performs task handoff with the second device.

For example, the cloud server iCloud establishes, by using a login account Apple ID selected by the user, a connection between a device corresponding to the Apple ID and the first device iPad, and if pairing is performed by using Bluetooth, the iCloud separately sends a pairing key to a second device selected by the user and the iPad, so that the second device selected by the user and the iPad can be successfully paired.

In this embodiment of the present invention, when a fingerprint input by a user matches fingerprint information of a registered fingerprint of the user, a first device acquires identifiers of multiple adjacent devices by using Bluetooth or Wireless Fidelity WI-FI; the first device uploads the identifiers of the multiple adjacent devices to a cloud server, and requests, from the cloud server, login accounts of devices corresponding to the identifiers; the first device acquires the login accounts sent by the cloud server, so that the user can select, from the multiple adjacent devices, a second device according to the login accounts; and the first device establishes a connection to the second device by using the cloud server, and performs task handoff with the second device. In this way, another device or user is prevented from acquiring and executing a task executed on the first device during task handoff, thereby avoiding privacy disclosure or a data content loss and improving data security; in addition, in the present invention, a login account of the second device and a login account of the first device may be the same or may be different, and a fingerprint does not need to be registered on the second device, which has better flexibility and greatly improves user experience.

Figure 10:
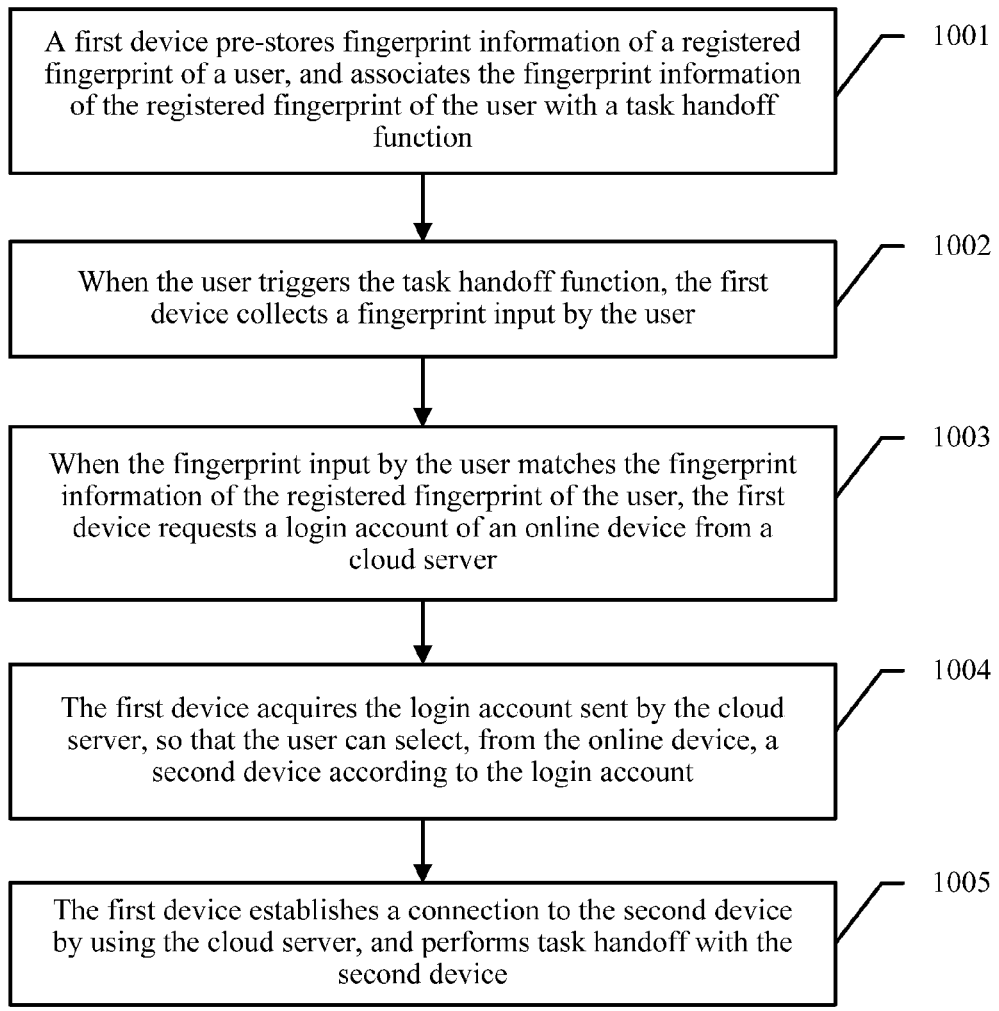
FIG. 10 is a schematic flowchart of another embodiment of a task handoff method according to the present invention.

Referring to FIG. 10, another embodiment of a task handoff method provided in the present invention includes the following steps:

1001. A first device pre-stores fingerprint information of a registered fingerprint of a user, and associates the fingerprint information of the registered fingerprint of the user with a task handoff function.

1002. When the user triggers the task handoff function, the first device collects a fingerprint input by the user.

For steps 1001 and 1002, reference may be made to steps 801 and 802, and details are not described herein.

1003. When the fingerprint input by the user matches the fingerprint information of the registered fingerprint of the user, the first device requests a login account of an online device from a cloud server.

It should be noted that when the fingerprint input by the user matches the fingerprint information of the registered fingerprint of the user, the first device requests the login account of the online device from the cloud server, where the cloud server is associated with a login account of the first device, and the login account of the online device is stored in family sharing of the cloud server.

1004. The first device acquires the login account sent by the cloud server, so that the user can select, from the online device, a second device according to the login account.

It should be noted that the first device acquires the login account sent by the cloud server, so that the user can select, from the online device, the second device according to the login account, where the login account of the first device and a login account of the second device are different. For example, a cloud server iCloud searches for an online device in a family sharing family share of the iCloud, and sends a login account Apple ID of the current online device to a first device iPad, so that the user can select, from the online device, a second device according to the Apple ID.

1005. The first device establishes a connection to the second device by using the cloud server, and performs task handoff with the second device.

For example, the cloud server iCloud establishes, by using a login account Apple ID selected by the user, a connection between a device corresponding to the Apple ID and the first device iPad, and if pairing is performed by using Bluetooth, the iCloud separately sends a pairing key to a second device selected by the user and the iPad, so that the second device selected by the user and the iPad can be successfully paired.

In this embodiment of the present invention, when a fingerprint input by a user matches fingerprint information of a registered fingerprint of the user, a first device requests a login account of an online device from a cloud server; the first device acquires the login account sent by the cloud server, so that the user can select, from the online device, a second device according to the login account; the first device establishes a connection to the second device by using the cloud server, and performs task handoff with the second device. In this way, another device or user is prevented from acquiring and executing a task executed on the first device during task handoff, thereby avoiding privacy disclosure or a data content loss and improving data security; in addition, in the present invention, a login account of the second device and a login account of the first device may be the same or may be different, and a fingerprint does not need to be registered on the second device, which has better flexibility and greatly improves user experience.

To facilitate understanding, the following uses a specific application scenario to describe in detail the task handoff method in this embodiment of the present invention.

A process in which a task of editing an email is handed off between an iPhone and an iPad is used as an example for the following description.

First, a user registers fingerprint information of one or more fingers on the iPhone, and edits an email on the iPhone, where the fingerprint information includes a sketch and a hash of a fingerprint; an iPhone iOS detects a touch performed by a finger on an email handoff function key, and when a touch operation is detected, an operation of handing off editing of the email to the adjacent iPad is triggered; if a same iCloud account is used to log in to the iPad and the iPhone, the current task on the iPhone is automatically synchronized to the adjacent iPad; if different iCloud accounts are used to log in to the iPad and the iPhone, the fingerprint information stored in the iPhone is associated with a handoff function in advance, and association information is stored. The touch performed by the finger on the handoff function key is detected on the iPhone, and a fingerprint image of the finger used by the user to operate is acquired, and then whether a fingerprint matches the fingerprint information stored in the iPhone is verified; if the fingerprint matches the fingerprint information stored in the iPhone, it is determined that the current task on the iPhone is synchronized to the adjacent device. The iPhone acquires information about multiple adjacent devices, including information about Apple IDs used to log in to the multiple adjacent devices. The iPhone presents the Apple IDs of the multiple adjacent devices, so that the user can select an adjacent device to which the current task is to be synchronized. The user selects Apple ID information of the iPad, so as to synchronize the current task on the iPhone to the adjacent iPad.

The iPhone sends email account information to an email server Email Server, and requests an email identity from the Email Server; the Email Server stores the email account information, and allocates a corresponding email identity for the email; the Email Server sends the email identity to the iPhone; the iPhone packs the email identity and the current task of editing the email; and the iPhone sends the current task and the attached email identity to the iPad.

An icon of an email application is displayed on an iPad screen, so as to inform the user that there is an email task that can be handed off, and request the user to input a fingerprint; after the user inputs the fingerprint on the iPad, a fingerprint recognition sensor collects fingerprint information of the user; the iPad requests fingerprint sketches and hashes of the one or more fingers from the iPhone; the iPad receives the fingerprint sketches and hashes that are of the one or more fingers and that are securely transmitted by the iPhone, a fingerprint template is restored according to the fingerprint sketches and with reference to the fingerprint input by the user on the iPad, and a hash of the fingerprint template is calculated.

The iPad determines whether the hash of the restored fingerprint template matches the received hashes that are of the one or more fingers and that are securely transmitted by the iPhone. If the hash of the restored fingerprint template matches the received hashes that are of the one or more fingers and that are securely transmitted by the iPhone, fingerprint verification succeeds. When the icon corresponding to the email application is slid upward by a finger on the iPad, an app, on the iPad, corresponding to the icon of the email application is enabled, and then the current task of editing the email on the iPhone is synchronized, so that the user continues editing the email on the iPad.

After editing of the email is completed, the iPad sends an email to the Email Server, and an email identity is attached. The Email Server searches for email account information corresponding to the email identity, and sends an email by using correct information about a sender. The Email Server sends, to the iPad, a notification that the email is successfully sent. The iPad clears all data related to the task that is handed off. If the hash of the restored fingerprint template does not match the received hashes that are of the one or more fingers and that are securely transmitted by the iPhone, the fingerprint verification fails, and the iPad cannot execute a task that is the same as that on the iPhone.

Figure 11:
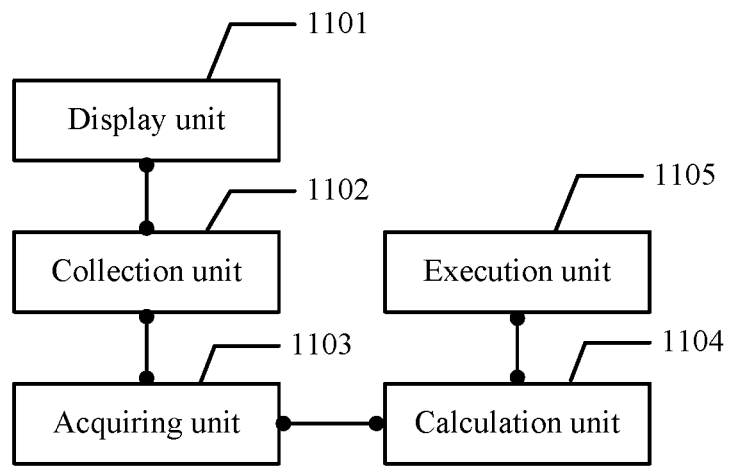
FIG. 11 is a schematic structural diagram of an embodiment of a task handoff device according to the present invention.

The task handoff method provided in the present invention is described above, and a structure of a task handoff device is described below from a perspective of an apparatus, that is, from the perspective of the foregoing second device. Referring to FIG. 11, in an embodiment, the task handoff device includes:

a display unit 1101, configured to display prompt information, where the prompt information is used to inform a user that a task executed on a first device may be handed off to the second device for execution;

a collection unit 1102, configured to: receive a first operation of the user, and collect a fingerprint used when the user performs the first operation, where the first operation is used to request execution of the task on the second device;

an acquiring unit 1103, configured to acquire first fingerprint information and second fingerprint information by using the first device;

a calculation unit 1104, configured to calculate, according to the fingerprint used when the user performs the first operation and the first fingerprint information, third fingerprint information; and an execution unit 1105, configured to execute the task when the third fingerprint information matches the second fingerprint information.

In this embodiment of the present invention, a display unit 1101 displays prompt information; a collection unit 1102 receives a first operation of a user, and collects a fingerprint used when the user performs the first operation, where the first operation is used to request execution of a task on a second device; an acquiring unit 1103 acquires first fingerprint information and second fingerprint information by using a first device; a calculation unit 1104 calculates, according to the fingerprint used when the user performs the first operation and the first fingerprint information, third fingerprint information; and an execution unit 1105 executes the task when the third fingerprint information matches the second fingerprint information. In this way, another device or user is prevented from acquiring and executing the task executed on the first device during task handoff, thereby avoiding privacy disclosure or a data content loss and improving data security.

Figure 12:
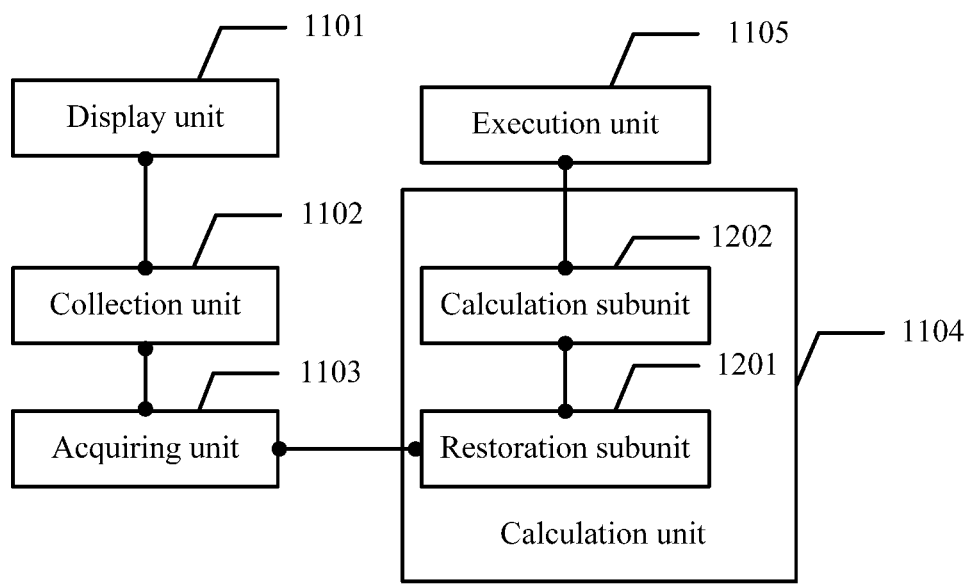
FIG. 12 is a schematic structural diagram of another embodiment of a task handoff device according to the present invention.

Optionally, referring to FIG. 12, in another embodiment, the first fingerprint information is a sketch of a registered fingerprint of the user, and the second fingerprint information is a hash of the registered fingerprint of the user; and the calculation unit 1104 specifically includes:

a restoration subunit 1201, configured to restore a fingerprint template according to the fingerprint used when the user performs the first operation and the sketch of the registered fingerprint of the user; and a calculation subunit 1202, configured to calculate a hash of the fingerprint template.

In this embodiment of the present invention, a restoration subunit 1201 restores a fingerprint template according to a fingerprint input when a user performs a first operation and a sketch of a registered fingerprint of the user; a calculation subunit 1202 calculates a hash of the fingerprint template; and a second device executes a task when the hash of the fingerprint template matches a hash of the registered fingerprint of the user. In this way, another device or user is prevented from acquiring and executing the task executed on the first device during task handoff, thereby avoiding privacy disclosure or a data content loss and improving data security.

Figure 13:
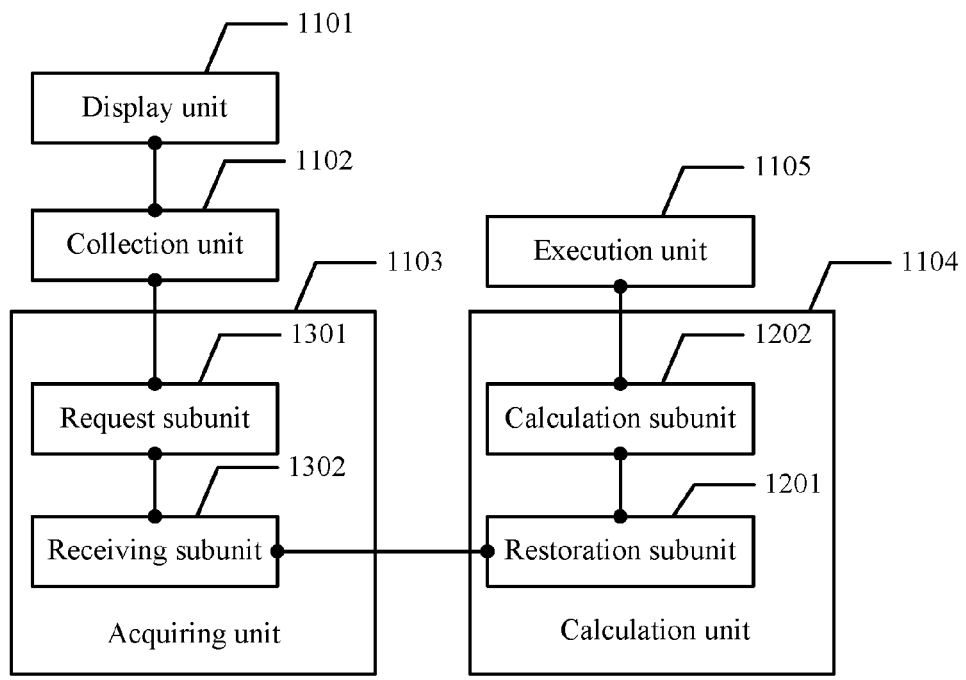
FIG. 13 is a schematic structural diagram of another embodiment of a task handoff device according to the present invention.

Optionally, referring to FIG. 13, in another embodiment, the acquiring unit 1103 specifically includes:

a request subunit 1301, configured to request, from the first device, the sketch and the hash of the registered fingerprint of the user; and a receiving subunit 1302, configured to receive the sketch and the hash that are of the registered fingerprint of the user and that are sent by the first device.

In this embodiment of the present invention, a request subunit 1301 requests, from a first device, a sketch and a hash of a registered fingerprint of a user; a receiving subunit 1302 receives the sketch and the hash that are of the registered fingerprint of the user and that are sent by the first device. Another device or user is prevented from acquiring and executing a task executed on the first device during task handoff, thereby avoiding privacy disclosure or a data content loss and improving data security. In addition, in the present invention, a login account of the task handoff device and a login account of the first device may be the same or may be different, and a fingerprint does not need to be registered on the task handoff device, which has better flexibility and greatly improves user experience.

Optionally, in another embodiment, the foregoing second acquiring unit 1103 is specifically configured to acquire the sketch and the hash that are of the registered fingerprint of the user and that are synchronized from a cloud server, where the cloud server is associated with a login account of the first device, and a login account of the second device and the login account of the first device are the same.

In this embodiment of the present invention, the task handoff device prevents another device or user from acquiring and executing a task on a first device during task handoff, thereby avoiding privacy disclosure or a data content loss and improving data security.

Figure 14:
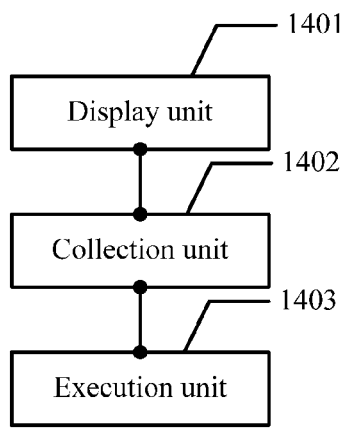
FIG. 14 is a schematic structural diagram of another embodiment of a task handoff device according to the present invention.

Referring to FIG. 14, in another embodiment, the task handoff device includes:

a display unit 1401, configured to display prompt information, where the prompt information is used to inform a user that a task executed on a first device may be handed off to the second device for execution;

a collection unit 1402, configured to: receive a first operation performed by the user on the prompt information, and collect a fingerprint used when the user performs the first operation, where the first operation is used to request execution of the task on the second device; and an execution unit 1403, configured to execute the task when the fingerprint used when the user performs the first operation matches fingerprint information that is of a registered fingerprint of the user and that is stored in a local storage of the second device.

In this embodiment of the present invention, a display unit 1401 displays prompt information, where the prompt information is used to inform a user that a task executed on a first device may be handed off to the second device for execution; a collection unit 1402 receives a first operation performed by the user on the prompt information, and collect a fingerprint used when the user performs the first operation, where the first operation is used to request execution of the task on the second device; and an execution unit 1403 executes the task when the fingerprint used when the user performs the first operation matches fingerprint information that is of a registered fingerprint of the user and that is stored in a local storage of the second device. In this way, another device or user is prevented from acquiring and executing the task executed on the first device during task handoff, thereby avoiding privacy disclosure or a data content loss and improving data security.

Optionally, a login account of the second device and a login account of the first device are the same, and fingerprint information of a registered fingerprint of a same user is stored in a local storage of a device associated with the login account.

Optionally, the first operation includes at least one of the following operation manners: tap, press, slide, rotation, or twist.

Figure 15:
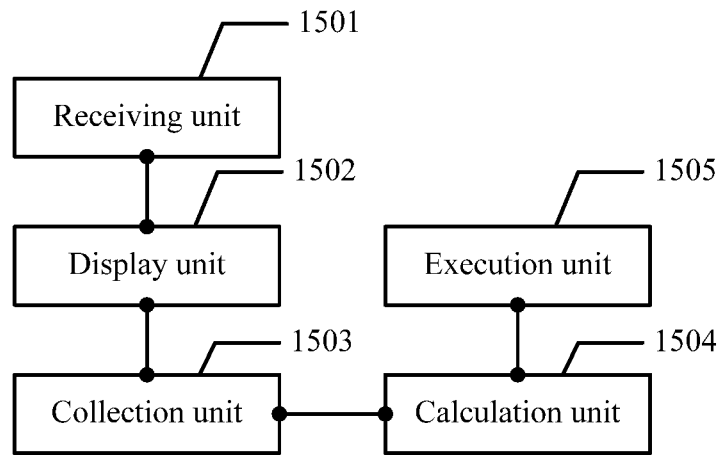
FIG. 15 is a schematic structural diagram of another embodiment of a task handoff device according to the present invention.

Referring to FIG. 15, in another embodiment, the task handoff device includes:

a receiving unit 1501, configured to receive first fingerprint information and second fingerprint information that are generated by a first device according to the second device selected by a user;

a display unit 1502, configured to display prompt information, where the prompt information is used to inform the user that a task executed on the first device may be handed off to the second device for execution;

a collection unit 1503, configured to: receive a first operation of the user, and collect a fingerprint used when the user performs the first operation, where the first operation is used to request execution of the task on the second device;

a calculation unit 1504, configured to calculate, according to the fingerprint used when the user performs the first operation and the first fingerprint information, third fingerprint information; and an execution unit 1505, configured to execute the task when the third fingerprint information matches the second fingerprint information.

In this embodiment of the present invention, a receiving unit 1501 receives first fingerprint information and second fingerprint information that are generated by a first device according to a second device selected by a user; a display unit 1502 displays prompt information, where the prompt information is used to inform the user that a task executed on the first device may be handed off to the second device for execution; a collection unit 1503 receives a first operation of the user, and collect a fingerprint used when the user performs the first operation, where the first operation is used to request execution of the task on the second device; a calculation unit 1504 calculates, according to the fingerprint used when the user performs the first operation and the first fingerprint information, third fingerprint information; and an execution unit 1505 executes the task when the third fingerprint information matches the second fingerprint information. In this way, another device or user is prevented from acquiring and executing the task executed on the first device during task handoff, thereby avoiding privacy disclosure or a data content loss and improving data security. In addition, in the present invention, a login account of the second device and a login account of the first device may be the same or may be different, and a fingerprint does not need to be registered on the second device or the first device, which has better flexibility and greatly improves user experience.

Figure 16:
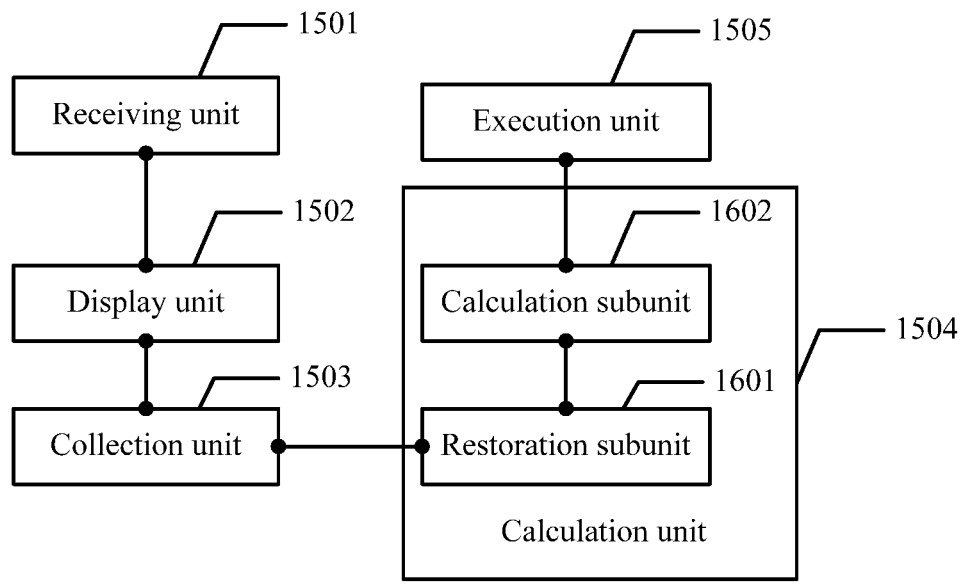
FIG. 16 is a schematic structural diagram of another embodiment of a task handoff device according to the present invention.

Optionally, referring to FIG. 16, in another embodiment, the first fingerprint information is a sketch of a first fingerprint of the user, and the second fingerprint information is a hash of the first fingerprint of the user; and the calculation unit 1504 specifically includes:

a restoration subunit 1601, configured to restore a fingerprint template according to the fingerprint used when the user performs the first operation and the sketch of the first fingerprint of the user; and a calculation subunit 1602, configured to calculate a hash of the fingerprint template.

In this embodiment of the present invention, a restoration subunit 1601 restores a fingerprint template according to a fingerprint input when a user performs a first operation and a sketch of a first fingerprint of the user; a calculation subunit 1602 calculates a hash of the fingerprint template; and a second device executes a task when the hash of the fingerprint template matches a hash of the first fingerprint of the user. In this way, another device or user is prevented from acquiring and executing the task executed on a first device during task handoff, thereby avoiding privacy disclosure or a data content loss and improving data security.

Figure 17:
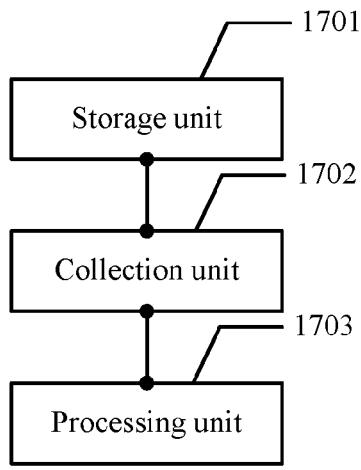
FIG. 17 is a schematic structural diagram of another embodiment of a task handoff device according to the present invention.

Referring to FIG. 17, in another embodiment, the task handoff device includes:

a storage unit 1701, configured to: pre-store fingerprint information of a registered fingerprint of a user, and associate the fingerprint information of the registered fingerprint of the user with a task handoff function;

a collection unit 1702, configured to: when the user triggers the task handoff function, collect a fingerprint input by the user; and a processing unit 1703, configured to: when the fingerprint input by the user matches the fingerprint information of the registered fingerprint of the user, acquire information about multiple adjacent devices, so that the user can select, from the multiple adjacent devices, a second device for performing task handoff; where a login account of the first device and a login account of the second device are different, and the information about the multiple adjacent devices includes respective login accounts of the multiple adjacent devices.

In this embodiment of the present invention, a storage unit 1701 pre-stores fingerprint information of a registered fingerprint of a user, and associates the fingerprint information of the registered fingerprint of the user with a task handoff function; a collection unit 1702 collect a fingerprint input by the user when the user triggers the task handoff function; and a processing unit 1703 acquires information about multiple adjacent devices when the fingerprint input by the user matches the fingerprint information of the registered fingerprint of the user, so that the user can select, from the multiple adjacent devices, a second device for performing task handoff. In this way, another device or user is prevented from acquiring and executing a task executed on a first device during task handoff, thereby avoiding privacy disclosure or a data content loss and improving data security; in addition, in the present invention, a login account of the second device and a login account of the first device may be the same or may be different, and a fingerprint does not need to be registered on the second device, which has better flexibility and greatly improves user experience.

Figure 18:
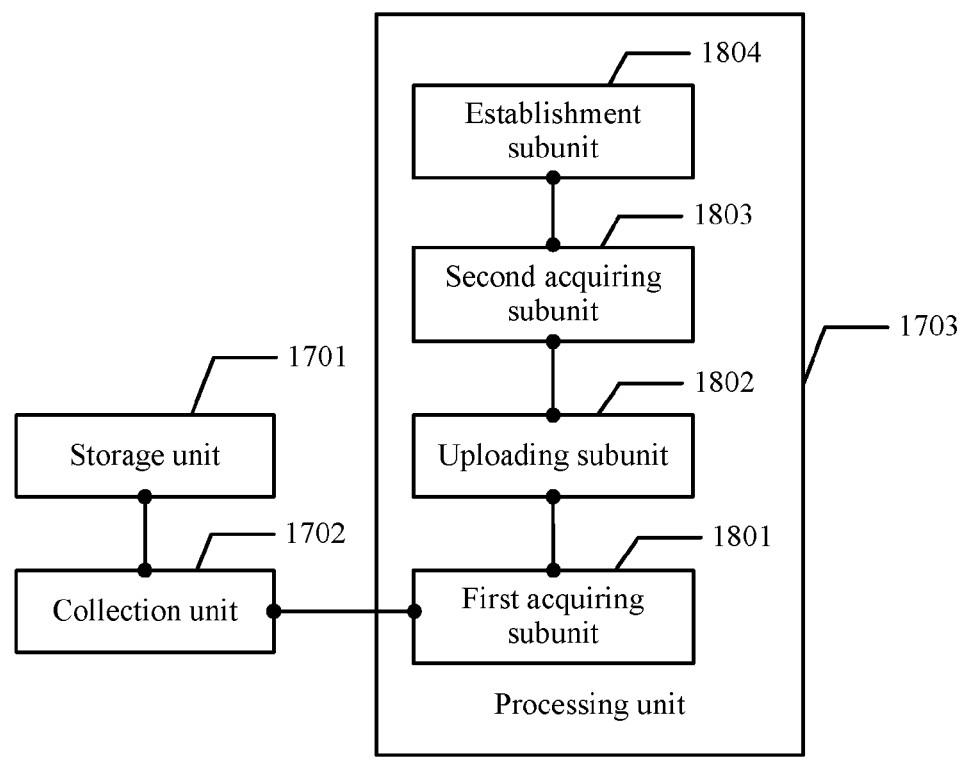
FIG. 18 is a schematic structural diagram of another embodiment of a task handoff device according to the present invention.

Optionally, referring to FIG. 18, in another embodiment, the foregoing processing unit 1703 specifically includes:

a first acquiring subunit 1801, configured to: when the fingerprint input by the user matches the fingerprint information of the registered fingerprint of the user, acquire identifiers of the multiple adjacent devices by using Bluetooth or Wireless Fidelity WI-FI;

an uploading subunit 1802, configured to: upload the identifiers of the multiple adjacent devices to a cloud server, and request, from the cloud server, login accounts of devices corresponding to the identifiers, where the cloud server is associated with the login account of the first device;

a second acquiring subunit 1803, configured to acquire the login accounts sent by the cloud server, so that the user can select, from the multiple adjacent devices, the second device according to the login accounts; and an establishment subunit 1804, configured to: establish a connection to the second device by using the cloud server, and perform task handoff with the second device.

In this embodiment of the present invention, a first acquiring subunit 1801 acquires, when a fingerprint input by a user matches fingerprint information of a registered fingerprint of the user, identifiers of multiple adjacent devices by using Bluetooth or Wireless Fidelity WI-FI; an uploading subunit 1802 uploads the identifiers of the multiple adjacent devices to a cloud server, and requests, from the cloud server, login accounts of devices corresponding to the identifiers, where the cloud server is associated with a login account of a first device; a second acquiring subunit 1803 acquires the login accounts sent by the cloud server, so that the user can select, from the multiple adjacent devices, a second device according to the login accounts; and an establishment subunit 1804 establishes a connection to the second device by using the cloud server, and perform task handoff with the second device. In this way, another device or user is prevented from acquiring and executing a task executed on the first device during task handoff, thereby avoiding privacy disclosure or a data content loss and improving data security; in addition, in the present invention, a login account of the second device and the login account of the first device may be the same or may be different, and a fingerprint does not need to be registered on the second device, which has better flexibility and greatly improves user experience.

Figure 19:
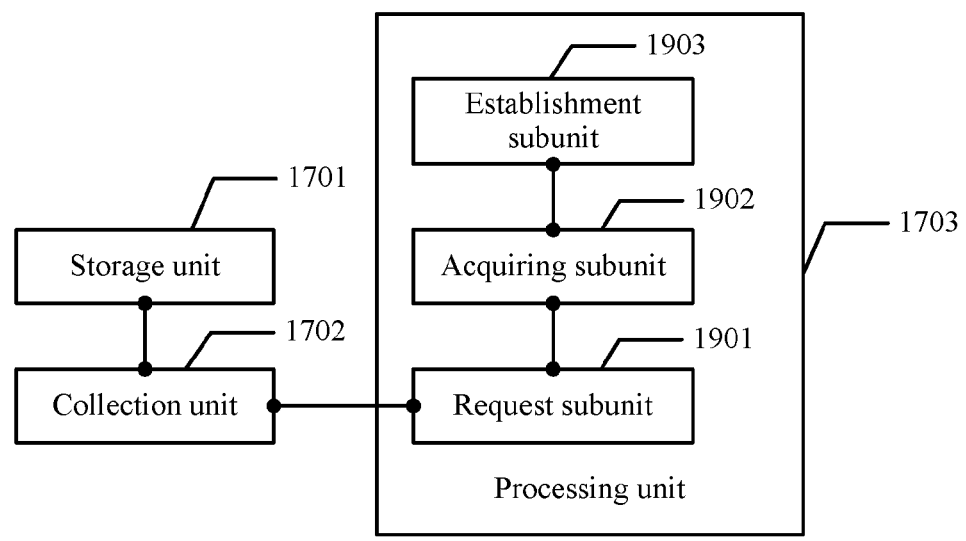
FIG. 19 is a schematic structural diagram of another embodiment of a task handoff device according to the present invention.

Optionally, referring to FIG. 19, in another embodiment, the foregoing processing unit 1703 specifically includes:

a request subunit 1901, configured to: when the fingerprint input by the user matches the fingerprint information of the registered fingerprint of the user, request, from a cloud server, a login account of an online device, where the cloud server is associated with a login account of the task handoff device, and the login account of the online device is stored in family sharing of the cloud server;

an acquiring subunit 1902, configured to acquire the login account sent by the cloud server, so that the user can select, from the online device, the second device according to the login account; and an establishment subunit 1903, configured to: establish a connection to the second device by using the cloud server, and perform task handoff with the second device.

In this embodiment of the present invention, a request subunit 1901 requests, from a cloud server, a login account of an online device when a fingerprint input by a user matches fingerprint information of a registered fingerprint of the user, where the cloud server is associated with a login account of the task handoff device, and the login account of the online device is stored in family sharing of the cloud server; an acquiring subunit 1902 acquires the login account sent by the cloud server, so that the user can select, from the online device, a second device according to the login account; and an establishment subunit 1903 establishes a connection to the second device by using the cloud server, and performs task handoff with the second device. In this way, another device or user is prevented from acquiring and executing a task executed on a first device during task handoff, thereby avoiding privacy disclosure or a data content loss and improving data security; in addition, in the present invention, a login account of the second device and a login account of the first device may be the same or may be different, and a fingerprint does not need to be registered on the second device, which has better flexibility and greatly improves user experience.

In embodiments shown from FIG. 11 to FIG. 19, a specific structure of the task handoff device is described from a perspective of a function unit, and the specific structure of the task handoff device is described below from a perspective of hardware with reference to embodiments shown in FIG. 20 and FIG. 16.

Figure 20:
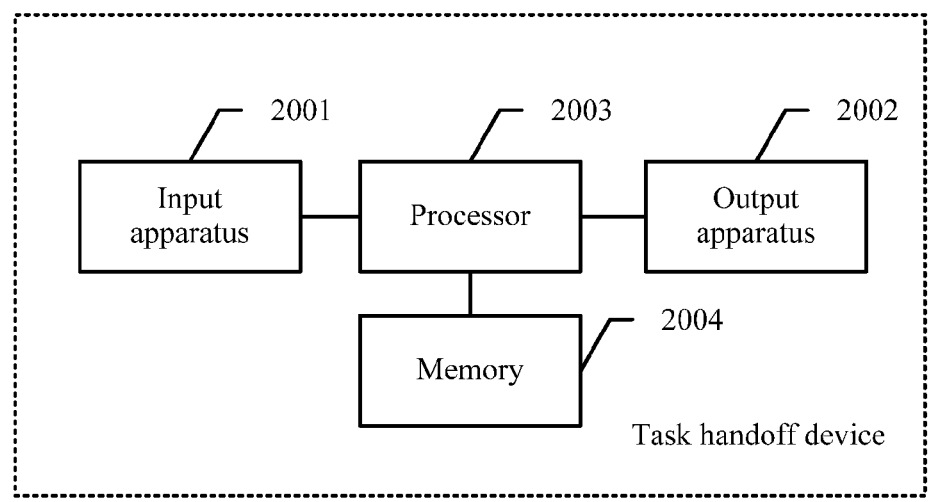
FIG. 20 is a schematic structural diagram of another embodiment of a task handoff device according to the present invention.

As shown in FIG. 20, the task handoff device includes: an input apparatus 2001, an output apparatus 2002, a processor 2003, and a memory 2004.

The task handoff device to which an embodiment of the present invention relates may have more or less parts than those shown in FIG. 20, may combine two or more parts, or may have different part configurations or settings. Various parts may be implemented in hardware including one or more signal processing and/or application-specific integrated circuits, in software, or in a combination of hardware and software.

The memory 2004 may include a read-only memory and a random access memory, and provides an instruction and data for the processor 2003. A part of the memory 2004 may further include a non-volatile random access memory.

The memory 2004 stores the following elements: an executable module or data structure, a subset of an executable module or data structure, or an extended set of an executable module or data structure:

operation instructions, including various operation instructions, used to implement various operations; and an operating system, including various system programs, used to implement various basic services and process hardware-based tasks.

In this embodiment of the present invention, the output apparatus 2002 is configured to:

display prompt information, where the prompt information is used to inform a user that a task executed on a first device may be handed off to the second device for execution.

In this embodiment of the present invention, the input apparatus 2001 is configured to:

receive a first operation of the user, and collect a fingerprint used when the user performs the first operation, where the first operation is used to request execution of the task on the second device.

In this embodiment of the present invention, the processor 2003 is configured to:

acquire first fingerprint information and second fingerprint information by using the first device;

calculate, according to the fingerprint used when the user performs the first operation and the first fingerprint information, third fingerprint information; and execute the task when the third fingerprint information matches the second fingerprint information.

In this embodiment of the present invention, a processor 2003 acquires first fingerprint information and second fingerprint information by using a first device; calculates, according to a fingerprint input when a user performs a first operation and the first fingerprint information, third fingerprint information; and executes a task when the third fingerprint information matches the second fingerprint information. In this way, another device or user is prevented from acquiring and executing the task executed on the first device during task handoff, thereby avoiding privacy disclosure or a data content loss and improving data security.

Optionally, the first fingerprint information is a sketch of a registered fingerprint of the user, and the second fingerprint information is a hash of the registered fingerprint of the user; and the processor 2003 is specifically configured to:

restore a fingerprint template according to the fingerprint used when the user performs the first operation and the sketch of the registered fingerprint of the user; and calculate a hash of the fingerprint template.

Optionally, the processor 1503 is specifically configured to:

request, from the first device, the sketch and the hash of the registered fingerprint of the user; and receive the sketch and the hash that are of the registered fingerprint of the user and that are sent by the first device.

Optionally, the processor 1503 is specifically configured to:

acquire the sketch and the hash that are of the registered fingerprint of the user and that are synchronized from a cloud server, where the cloud server is associated with a login account of the first device, and a login account of the second device and a login account of the first device are the same.

Figure 21:
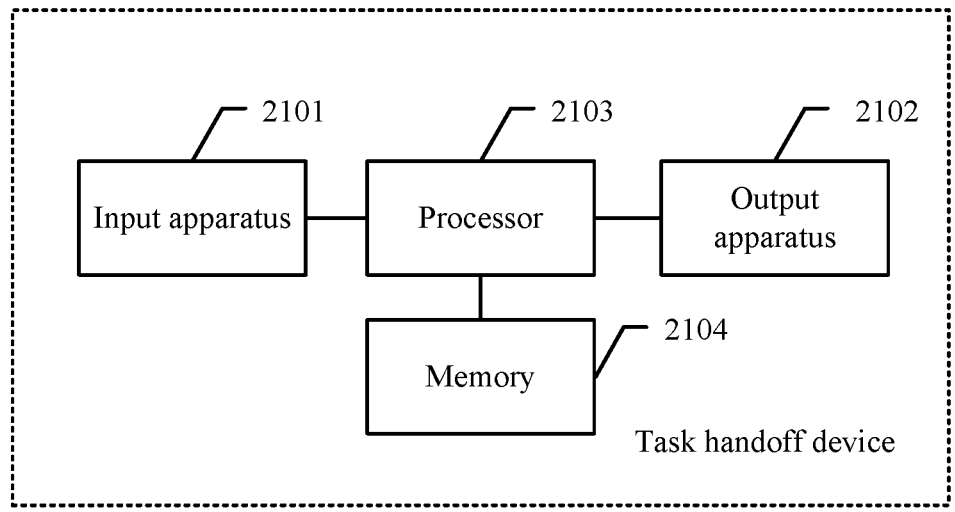
FIG. 21 is a schematic structural diagram of another embodiment of a task handoff device according to the present invention.

As shown in FIG. 21, the task handoff device includes: an input apparatus 2101, an output apparatus 2102, a processor 2103, and a memory 2104.

In an embodiment of the present invention, the output apparatus 2102 is configured to:

display prompt information, where the prompt information is used to inform a user that a task executed on a first device may be handed off to the second device for execution.

In this embodiment of the present invention, the input apparatus 2101 is configured to:

receive a first operation performed by the user on the prompt information, and collect a fingerprint used when the user performs the first operation, where the first operation is used to request execution of the task on the second device.

In this embodiment of the present invention, the processor 2103 is configured to:

execute the task when the fingerprint used when the user performs the first operation matches fingerprint information that is of a registered fingerprint of the user and that is stored in a local storage of the second device.

In this embodiment of the present invention, a processor 2103 executes a task when a fingerprint, input when a user performs a first operation, matches fingerprint information that is of a registered fingerprint of the user and that is stored in a local storage of a second device. In this way, another device or user is prevented from acquiring and executing the task on a first device during task handoff, thereby avoiding privacy disclosure or a data content loss and improving data security.

Optionally, a login account of the second device and a login account of the first device are the same, and fingerprint information of a registered fingerprint of a same user is stored in a local storage of a device associated with the login account.

Optionally, the first operation includes at least one of the following operation manners: tap, press, slide, rotation, or twist.

Figure 22:
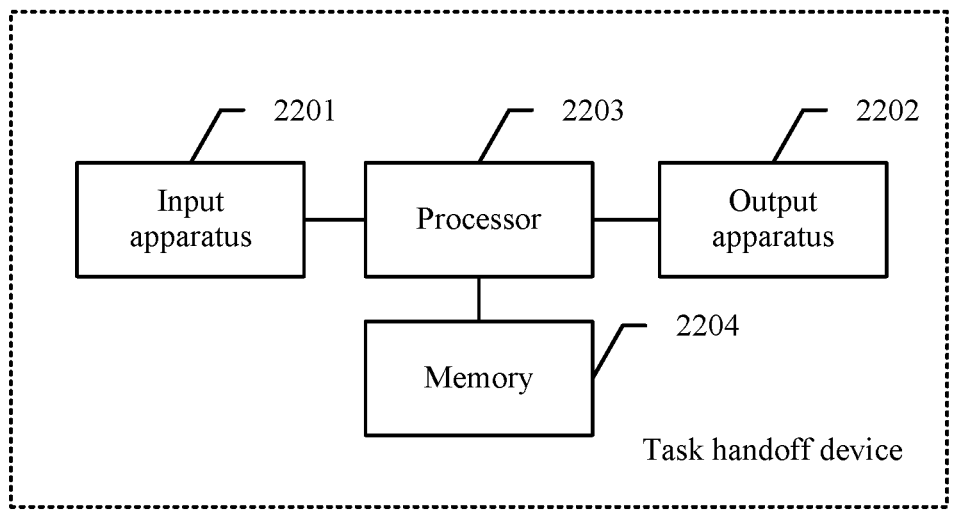
FIG. 22 is a schematic structural diagram of another embodiment of a task handoff device according to the present invention.

As shown in FIG. 22, the task handoff device includes: an input apparatus 2201, an output apparatus 2202, a processor 2203, and a memory 2204.

In an embodiment of the present invention, the input apparatus 2201 is configured to:

receive first fingerprint information and second fingerprint information that are generated by a first device according to the second device selected by a user.

In this embodiment of the present invention, the output apparatus 2202 is configured to:

display prompt information, where the prompt information is used to inform the user that a task executed on the first device may be handed off to the second device for execution.

In this embodiment of the present invention, the input apparatus 2201 is further configured to:

receive a first operation of the user, and collect a fingerprint used when the user performs the first operation, where the first operation is used to request execution of the task on the second device.

In this embodiment of the present invention, the processor 2203 is configured to:

calculate, according to the fingerprint used when the user performs the first operation and the first fingerprint information, third fingerprint information; and execute the task when the third fingerprint information matches the second fingerprint information.

In this embodiment of the present invention, a processor 2203 calculates, according to a fingerprint input when a user performs a first operation and first fingerprint information, third fingerprint information; and executes a task when the third fingerprint information matches second fingerprint information. In this way, another device or user is prevented from acquiring and executing the task executed on a first device during task handoff, thereby avoiding privacy disclosure or a data content loss and improving data security.

Optionally, the first fingerprint information is a sketch of a first fingerprint of the user, and the second fingerprint information is a hash of the first fingerprint of the user; and the processor 2203 is specifically configured to:

restore a fingerprint template according to the fingerprint used when the user performs the first operation and the sketch of the first fingerprint of the user; and calculate a hash of the fingerprint template.

Figure 23:
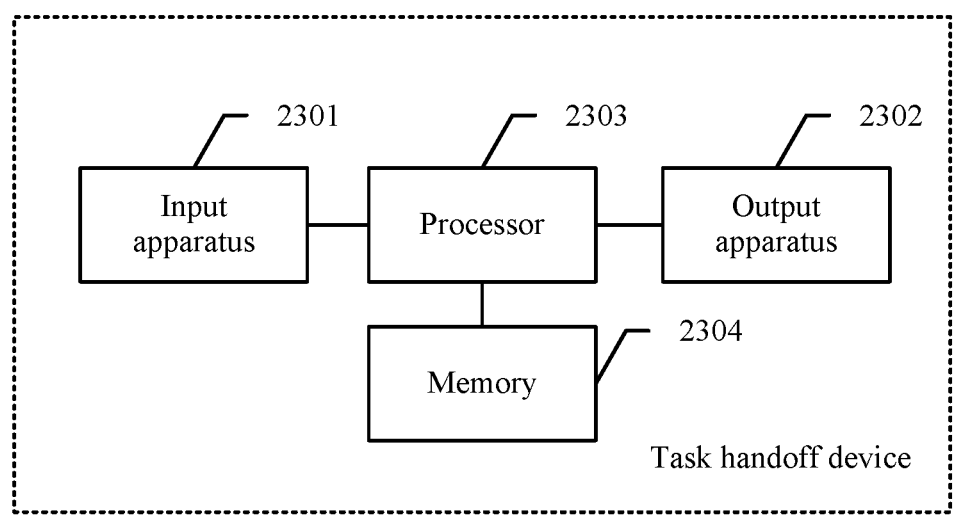
FIG. 23 is a schematic structural diagram of another embodiment of a task handoff device according to the present invention.

As shown in FIG. 23, the task handoff device includes: an input apparatus 2301, an output apparatus 2302, a processor 2303, and a memory 2304.

In an embodiment of the present invention, the processor 2303 is configured to:

pre-store fingerprint information of a registered fingerprint of a user, and associates the fingerprint information of the registered fingerprint of the user with a task handoff function.

In this embodiment of the present invention, the input apparatus 2301 is configured to:

collect a fingerprint input by the user when the user triggers the task handoff function.

In this embodiment of the present invention, the processor 2303 is further configured to:

when the fingerprint input by the user matches the fingerprint information of the registered fingerprint of the user, acquire information about multiple adjacent devices, so that the user can select, from the multiple adjacent devices, a second device for performing task handoff; where a login account of the first device and a login account of the second device are different, and the information about the multiple adjacent devices includes respective login accounts of the multiple adjacent devices.

In this embodiment of the present invention, a processor 2303 pre-stores fingerprint information of a registered fingerprint of a user, and associates the fingerprint information of the registered fingerprint of the user with a task handoff function; when a fingerprint input by the user matches the fingerprint information of the registered fingerprint of the user, the processor 2303 acquires information about multiple adjacent devices, so that the user can select, from the multiple adjacent devices, a second device for performing task handoff. In this way, another device or user is prevented from acquiring and executing a task executed on a first device during task handoff, thereby avoiding privacy disclosure or a data content loss and improving data security.

Optionally, the processor 2303 is specifically configured to:

when the fingerprint input by the user matches the fingerprint information of the registered fingerprint of the user, acquire identifiers of the multiple adjacent devices by using Bluetooth or Wireless Fidelity WI-FI;

upload the identifiers of the multiple adjacent devices to a cloud server, and request, from the cloud server, login accounts of devices corresponding to the identifiers, where the cloud server is associated with a login account of the task handoff device;

acquire the login accounts sent by the cloud server, so that the user can select, from the multiple adjacent devices, the second device according to the login accounts; and establish a connection to the second device by using the cloud server, and perform task handoff with the second device.

Optionally, the processor 2303 is specifically configured to:

when the fingerprint input by the user matches the fingerprint information of the registered fingerprint of the user, request, from a cloud server, a login account of an online device, where the cloud server is associated with a login account of the task handoff device, and the login account of the online device is stored in family sharing of the cloud server;

acquire the login account sent by the cloud server, so that the user can select, from the online device, the second device according to the login account; and establish a connection to the second device by using the cloud server, and perform task handoff with the second device.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of the present invention may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A task handoff method, comprising:

displaying, by a second device, prompt information, wherein the prompt information is used to inform a user that a task executed on a first device may be handed off to the second device for execution;

receiving, by the second device, a first operation of the user, and collecting a fingerprint input when the user performs the first operation, wherein the first operation is used to request execution of the task on the second device;

acquiring, by the second device, first fingerprint information and second fingerprint information by using the first device;

calculating, by the second device according to the fingerprint used when the user performs the first operation and the first fingerprint information, third fingerprint information; and executing, by the second device, the task when the third fingerprint information matches the second fingerprint information, wherein the first fingerprint information is a sketch of a registered fingerprint of the user, and the second fingerprint information is a hash value of the registered fingerprint of the user; and the calculating, by the second device according to the fingerprint used when the user performs the first operation and the first fingerprint information, third fingerprint information comprises:

restoring, by the second device, a fingerprint template according to the fingerprint used when the user performs the first operation and the sketch of the registered fingerprint of the user; and calculating, by the second device, a hash value of the fingerprint template.

2. The task handoff method according to claim 1, wherein the acquiring, by the second device, first fingerprint information and second fingerprint information by using the first device comprises:

requesting, by the second device from the first device, the sketch and the hash value of the registered fingerprint of the user; and receiving, by the second device, the sketch and the hash that are of the registered fingerprint of the user and that are sent by the first device.

3. The task handoff method according to claim 1, wherein the acquiring, by the second device, first fingerprint information and second fingerprint information by using the first device comprises:

acquiring, by the second device, the sketch and the hash that are of the registered fingerprint of the user and that are synchronized from a cloud server, wherein the cloud server is associated with a login account of the first device, and a login account of the second device and the login account of the first device are the same.

4. A task handoff method, comprising:

pre-storing, by a first device, fingerprint information of a registered fingerprint of a user, and associating the fingerprint information of the registered fingerprint of the user with a task handoff function;

when the user triggers the task handoff function, collecting, by the first device, a fingerprint input by the user;

when the fingerprint input by the user matches the fingerprint information of the registered fingerprint of the user, acquiring, by the first device, information about multiple adjacent devices, so that the user can select, from the multiple adjacent devices, a second device for performing task handoff, wherein a login account of the first device and a login account of the second device are different, and the information about the multiple adjacent devices comprises respective login accounts of the multiple adjacent devices;

displaying, by the second device, prompt information, wherein the prompt information is used to inform a user that a task executed on the first device may be handed off to the second device for execution;

receiving, by the second device, a first operation performed by the user on the prompt information, and collecting a fingerprint used when the user performs the first operation, wherein the first operation is used to request execution of the task on the second device;

requesting, by the second device from the first device, a sketch and a hash of a registered fingerprint of the user;

receiving, by the second device, the sketch and the hash that are of the registered fingerprint of the user sent by the first device;

restoring, by the second device, a fingerprint template according to the fingerprint input when the user performs the first operation and the sketch of the registered fingerprint of the user;

calculating, by the second device, a hash of the fingerprint template; and executing, by the second device, the task when the hash of the fingerprint template matches the hash of the registered fingerprint of the user.

5. The task handoff method according to claim 4, wherein the acquiring, by the first device, information about multiple adjacent devices, so that the user can select, from the multiple adjacent devices, a second device for performing task handoff comprises:

acquiring, by the first device, identifiers of the multiple adjacent devices by using Bluetooth or Wireless Fidelity WI-FI;

uploading, by the first device, the identifiers of the multiple adjacent devices to a cloud server, and requesting, from the cloud server, login accounts of devices corresponding to the identifiers, wherein the cloud server is associated with the login account of the first device;

acquiring, by the first device, the login accounts sent by the cloud server, so that the user can select, from the multiple adjacent devices, the second device according to the login accounts; and establishing, by the first device, a connection to the second device by using the cloud server, and performing task handoff with the second device.

6. The task handoff method according to claim 4, wherein the acquiring, by the first device, information about multiple adjacent devices, so that the user can select, from the multiple adjacent devices, a second device for performing task handoff comprises:

requesting, by the first device from a cloud server, a login account of an online device, wherein the cloud server is associated with the login account of the first device, and the login account of the online device is stored in family sharing of the cloud server;

acquiring, by the first device, the login account sent by the cloud server, so that the user can select, from the online device, the second device according to the login account; and establishing, by the first device, a connection to the second device by using the cloud server, and performing task handoff with the second device.

7. An apparatus, comprising:

a memory to store instructions; and a processor to execute the instructions to configure the apparatus to execute operations comprising:

displaying, by a second device, prompt information, wherein the prompt information is used to inform a user that a task executed on a first device may be handed off to the second device for execution;

receiving, by the second device, a first operation of the user, and collecting a fingerprint input when the user performs the first operation, wherein the first operation is used to request execution of the task on the second device;

acquiring, by the second device, first fingerprint information and second fingerprint information by using the first device;

calculating, by the second device according to the fingerprint used when the user performs the first operation and the first fingerprint information, third fingerprint information; and executing, by the second device, the task when the third fingerprint information matches the second fingerprint information, wherein the first fingerprint information is a sketch of a registered fingerprint of the user, and the second fingerprint information is a hash value of the registered fingerprint of the user; and the calculating, by the second device according to the fingerprint used when the user performs the first operation and the first fingerprint information, third fingerprint information comprises:

restoring, by the second device, a fingerprint template according to the fingerprint used when the user performs the first operation and the sketch of the registered fingerprint of the user; and calculating, by the second device, a hash value of the fingerprint template.

8. The apparatus according to claim 7, wherein the acquiring, by the second device, first fingerprint information and second fingerprint information by using the first device comprises:

requesting, by the second device from the first device, the sketch and the hash value of the registered fingerprint of the user; and receiving, by the second device, the sketch and the hash that are of the registered fingerprint of the user and that are sent by the first device.

9. The apparatus according to claim 7, wherein the acquiring, by the second device, first fingerprint information and second fingerprint information by using the first device comprises:

acquiring, by the second device, the sketch and the hash that are of the registered fingerprint of the user and that are synchronized from a cloud server, wherein the cloud server is associated with a login account of the first device, and a login account of the second device and the login account of the first device are the same.

* * * * *

UNITED STATES PATENT AND TRADEMARK OFFICE
CERTIFICATE OF CORRECTION

PATENT NO. : 10,229,259 B2  
APPLICATION NO. : 15/235865  
DATED : March 12, 2019  
INVENTOR(S) : Chan Wang et al.

Page 1 of 1

It is certified that error appears in the above-identified patent and that said Letters Patent is hereby corrected as shown below:

In Claim 5, Column 33, Line 54, delete "WI-F1" and insert --WI-FI-- therefor.

Signed and Sealed this  
Nineteenth Day of November, 2019

Andrei Iancu  
*Director of the United States Patent and Trademark Office*